(12) United States Patent
Chao et al.

(10) Patent No.: US 8,869,430 B2
(45) Date of Patent: Oct. 28, 2014

(54) METHOD OF MANUFACTURING A CONTOURED FLUID-FILLED CHAMBER WITH TENSILE STRUCTURES

(75) Inventors: Kirvan L. Chao, Portland, OR (US); Frederick J. Dojan, Vancouver, WA (US); Klaas P. Hazenberg, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 837 days.

(21) Appl. No.: 13/049,278

(22) Filed: Mar. 16, 2011

(65) Prior Publication Data
US 2012/0233880 A1    Sep. 20, 2012

(51) Int. Cl.
*A43B 13/20*    (2006.01)
*B29D 35/14*    (2010.01)

(52) U.S. Cl.
CPC .............. *A43B 13/20* (2013.01); *B29D 35/142* (2013.01)
USPC .......................... 36/28; 36/29; 36/35 B; 36/71

(58) Field of Classification Search
USPC ............................... 36/28, 29, 35 R, 35 B, 71
See application file for complete search history.

(56) References Cited

U.S. PATENT DOCUMENTS

| | | |
|---|---|---|
| 4,183,156 A | 1/1980 | Rudy |
| 4,219,945 A | 9/1980 | Rudy |
| 4,936,029 A | 6/1990 | Rudy |
| 5,042,176 A | 8/1991 | Rudy |
| 5,543,194 A | 8/1996 | Rudy |
| 5,625,964 A | 5/1997 | Lyden et al. |
| 5,713,141 A | 2/1998 | Mitchell et al. |
| 5,952,065 A | 9/1999 | Mitchell et al. |
| 6,013,340 A | 1/2000 | Bonk et al. |
| 6,082,025 A | 7/2000 | Bonk et al. |
| 6,127,026 A | 10/2000 | Bonk et al. |
| 6,203,868 B1 | 3/2001 | Bonk et al. |
| 6,321,465 B1 | 11/2001 | Bonk et al. |
| 6,385,864 B1 | 5/2002 | Sell, Jr. et al. |

(Continued)

FOREIGN PATENT DOCUMENTS

| | | |
|---|---|---|
| WO | WO9938403 | 8/1999 |
| WO | WO2012061313 | 5/2012 |

OTHER PUBLICATIONS

International Preliminary Report on Patentability for PCT/US2012/028108 mailed Sep. 26, 2013.

(Continued)

*Primary Examiner* — Marie Bays
(74) *Attorney, Agent, or Firm* — Plumsea Law Group, LLC

(57) ABSTRACT

In one method of manufacturing a fluid-filled chamber, two polymer layers are located between two mold portions, the surfaces of the mold portions cooperatively defining a peripheral cavity with first and second regions, an inward extent of the first region exceeding an inward extent of the second region. A tensile structure may be positioned between the polymer layers and the mold portions may be compressed together. Part of a peripheral portion of the chamber may be formed by drawing first and second areas of the chamber against the first and second regions of the peripheral cavity, respectively. After pressurization, the first region of the peripheral cavity may have a greater extent of outward protrusion than the second region of the peripheral cavity. Accordingly, an asymmetric medio-lateral shape may be imparted to the chamber without the use of a tensile structure that is itself tapered or contoured.

13 Claims, 33 Drawing Sheets

(56) References Cited

U.S. PATENT DOCUMENTS

| | | | |
|---|---|---|---|
| 6,883,253 B2* | 4/2005 | Smith et al. | 36/28 |
| 7,070,845 B2 | 7/2006 | Thomas et al. | |
| 7,076,891 B2* | 7/2006 | Goodwin | 36/29 |
| 7,131,218 B2 | 11/2006 | Schindler | |
| 7,210,249 B2 | 5/2007 | Passke et | |
| 7,386,946 B2* | 6/2008 | Goodwin | 36/29 |
| 7,409,779 B2 | 8/2008 | Dojan et al. | |
| 7,588,654 B2 | 9/2009 | Schindler et al. | |
| 7,591,919 B2 | 9/2009 | Schindler et al. | |
| 2002/0121031 A1* | 9/2002 | Smith et al. | 36/29 |
| 2005/0097777 A1* | 5/2005 | Goodwin | 36/29 |
| 2005/0183287 A1 | 8/2005 | Schindler | |
| 2006/0225304 A1* | 10/2006 | Goodwin | 36/35 B |
| 2007/0169376 A1 | 7/2007 | Hatfield et al. | |
| 2009/0288312 A1 | 11/2009 | Dua | |
| 2009/0288313 A1 | 11/2009 | Rapaport et al. | |
| 2011/0131831 A1 | 6/2011 | Peyton et al. | |
| 2012/0233879 A1* | 9/2012 | Dojan et al. | 36/29 |

OTHER PUBLICATIONS

International Search Report and Written Opinion in PCT Application No. PCT/US2012/028108, mailed on Jul. 10, 2012.

International Search Report and Written Opinion in PCT Application No. PCT/US2012/028101, mailed on Sep. 6, 2012.

International Search Report and Written Opinion in PCT Application No. PCT/US2012/027915, mailed on Aug. 27, 2012.

* cited by examiner

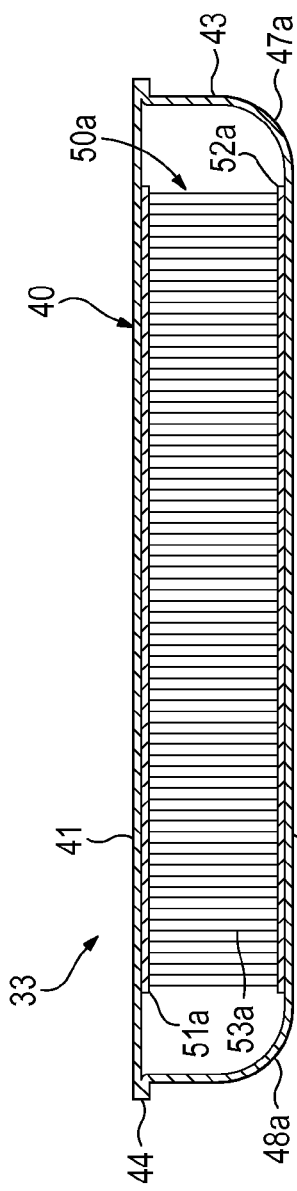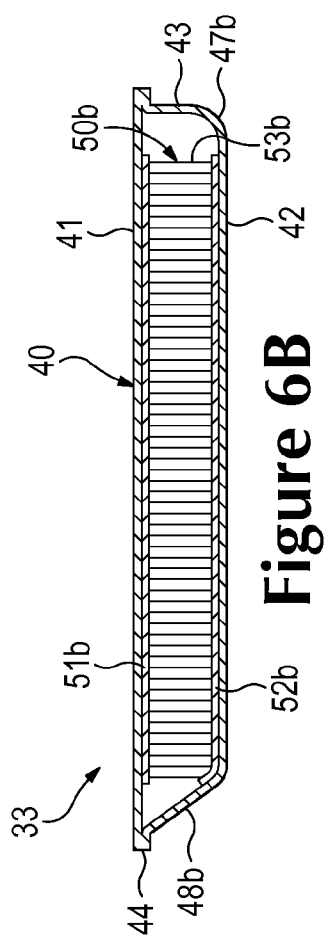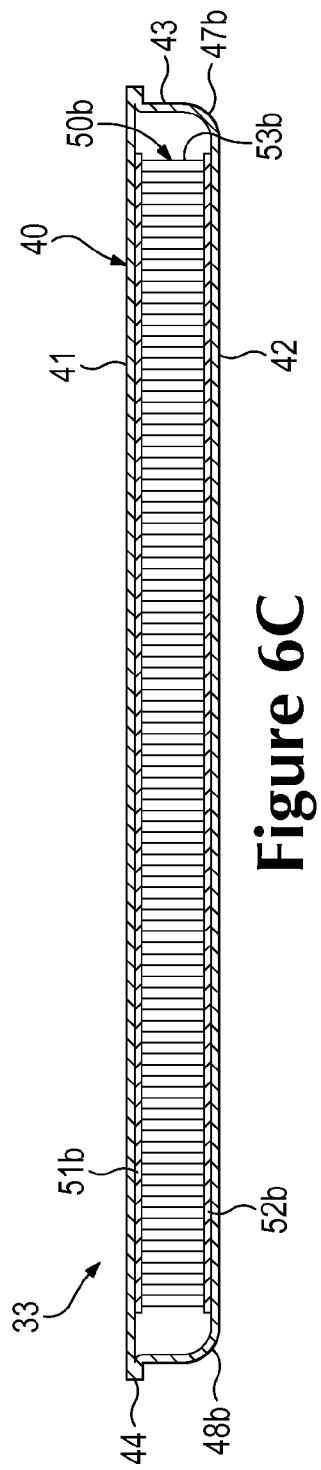

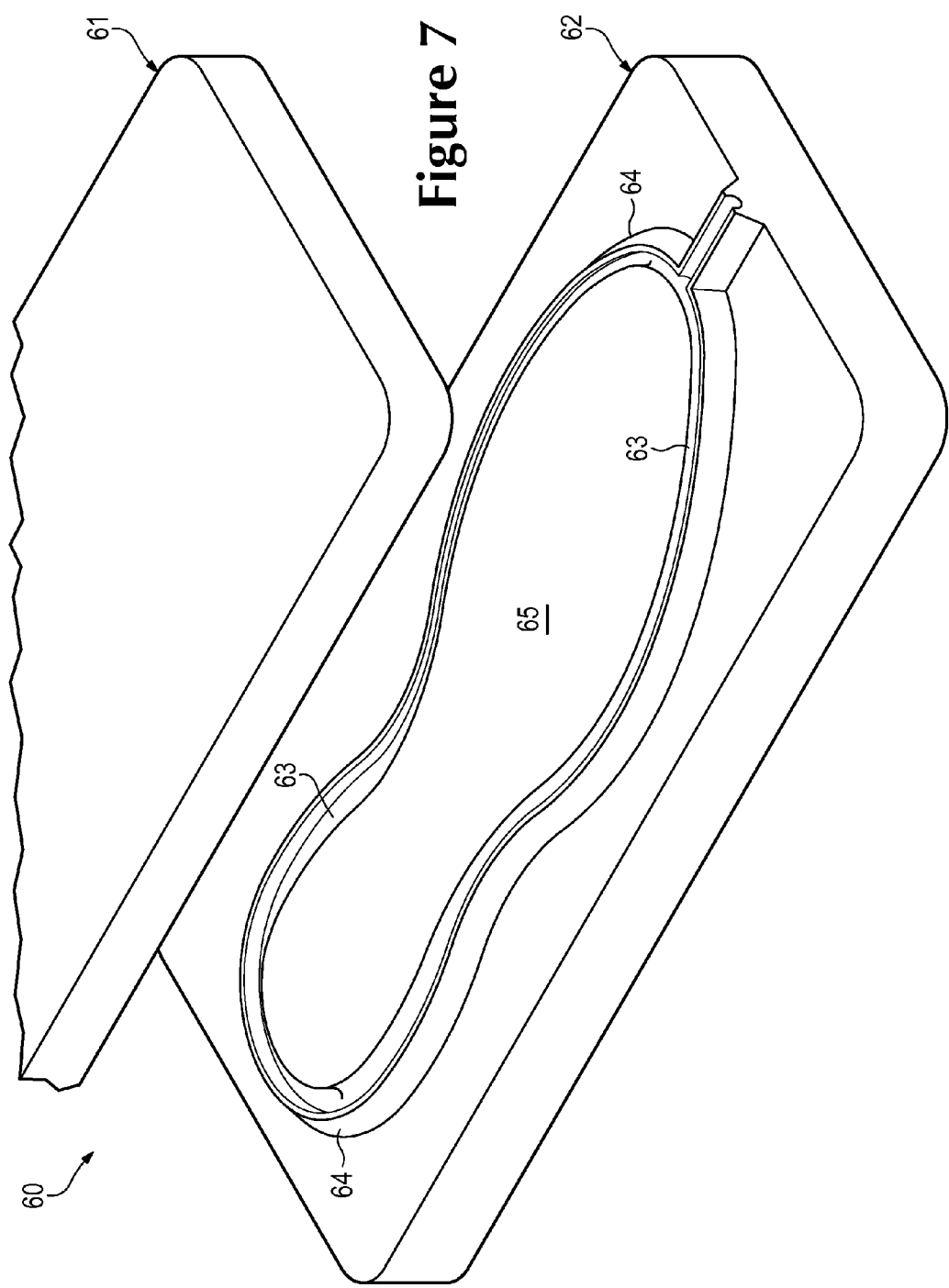

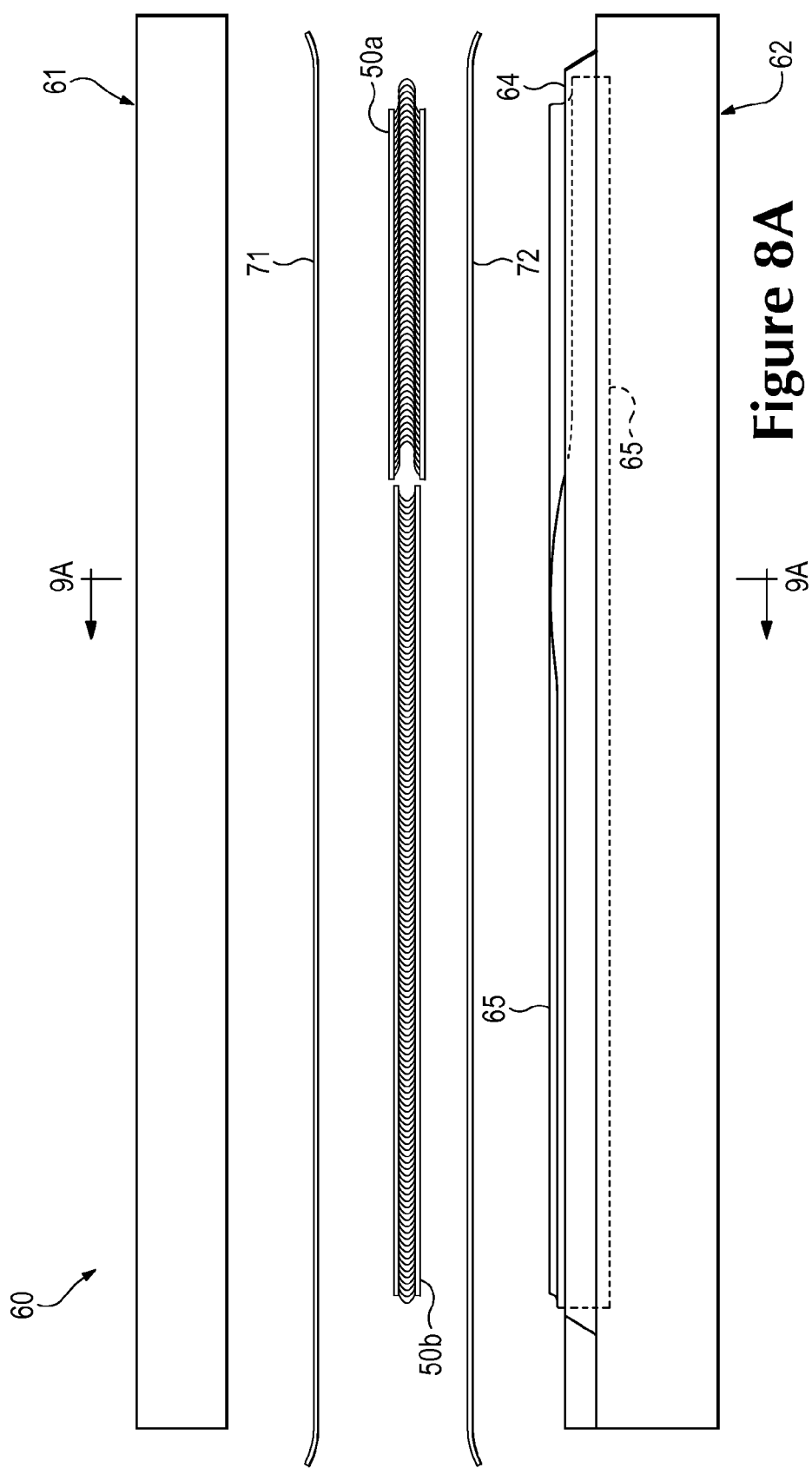

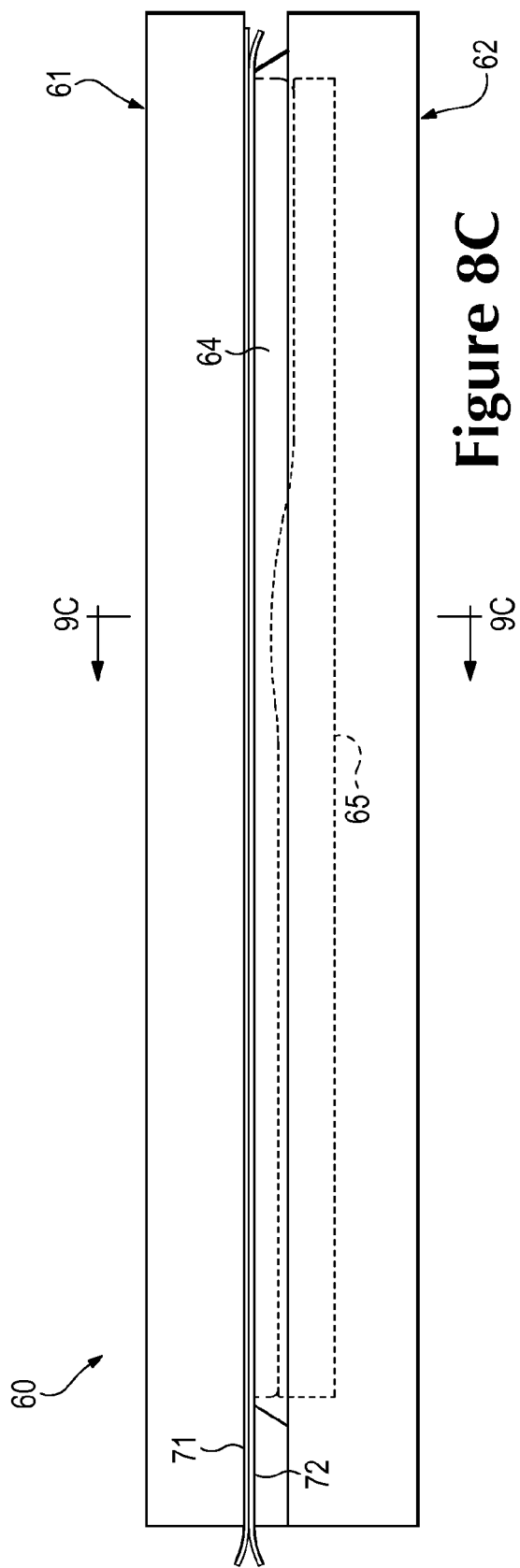

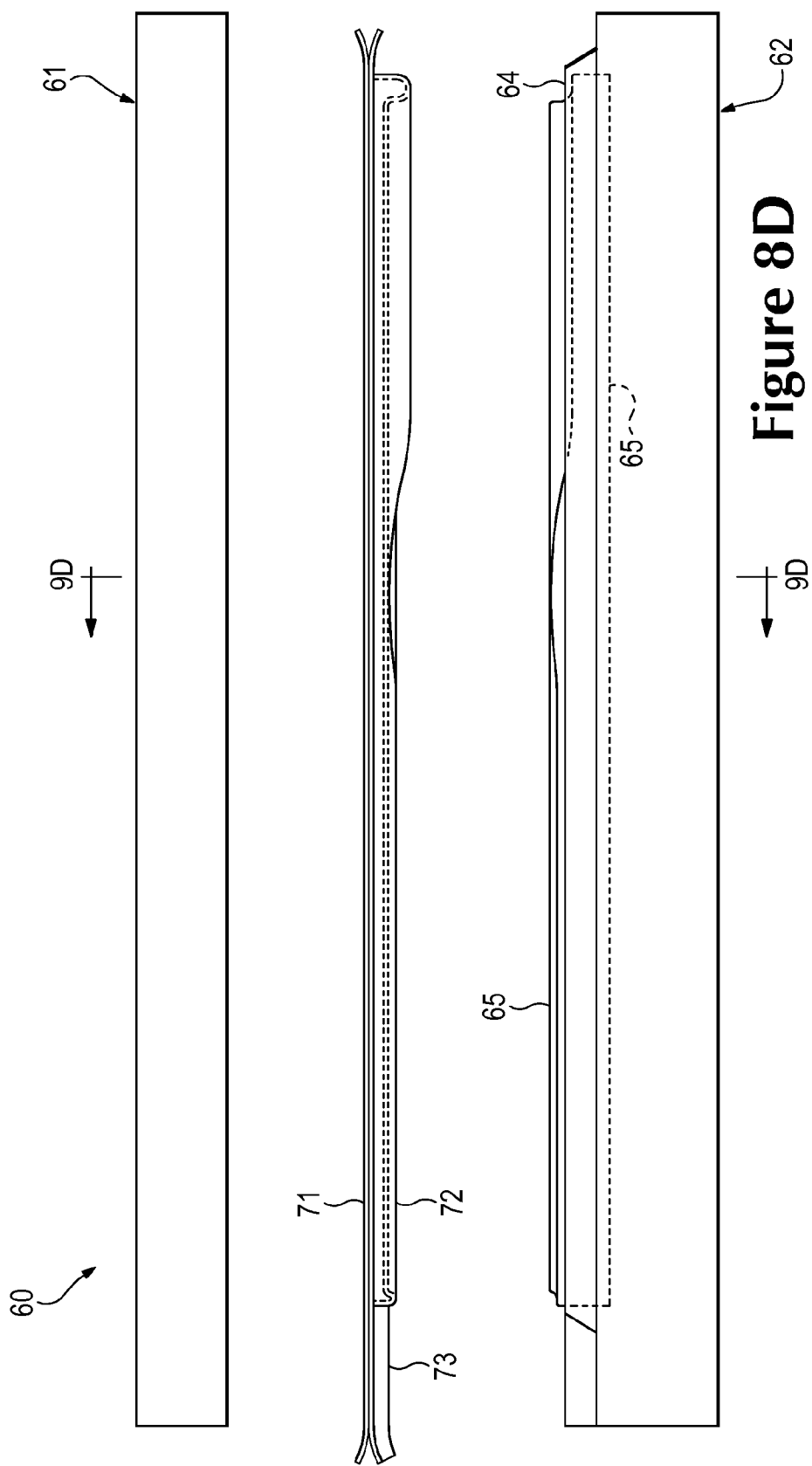

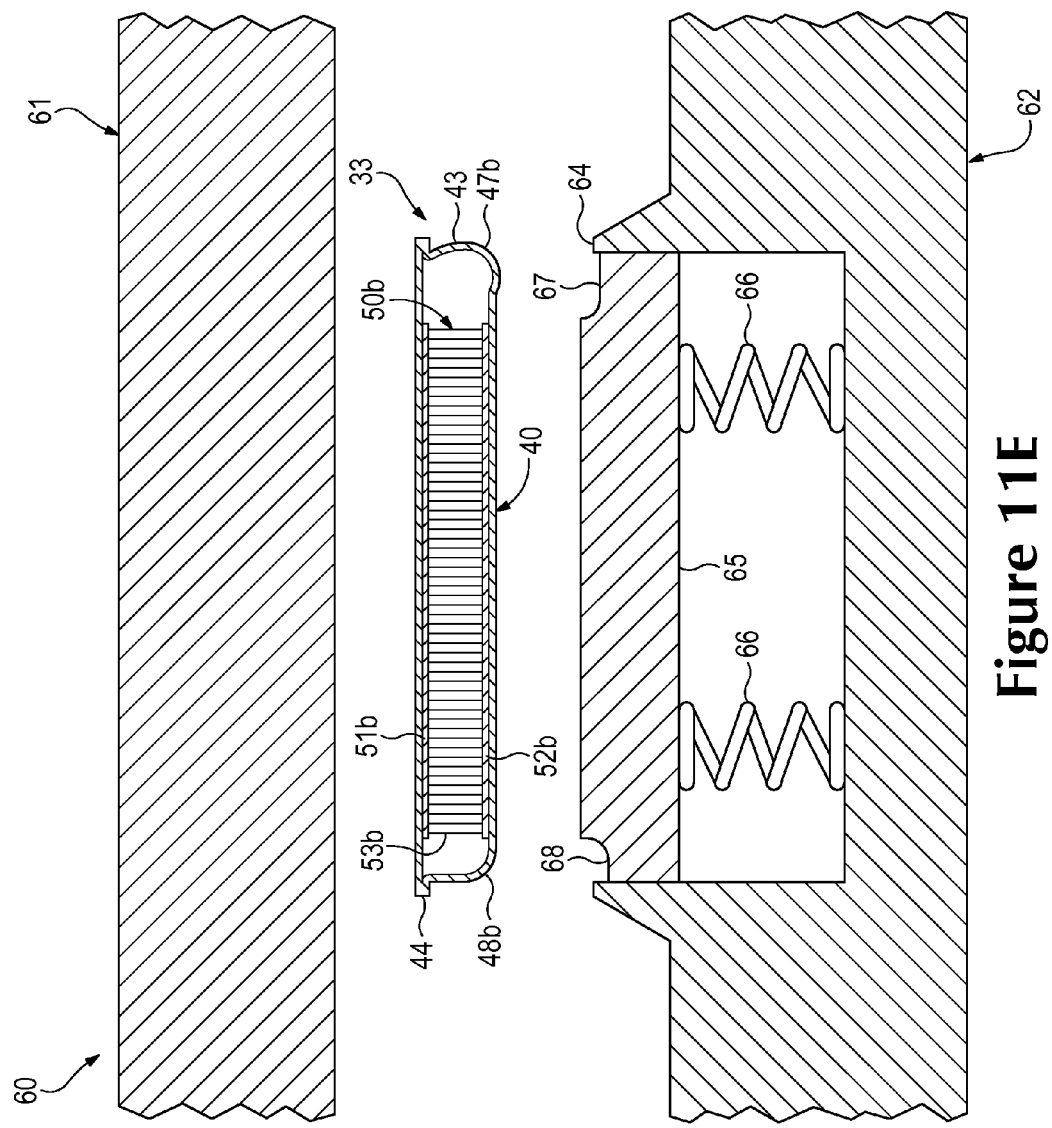

METHOD OF MANUFACTURING A CONTOURED FLUID-FILLED CHAMBER WITH TENSILE STRUCTURES

BACKGROUND

Articles of footwear generally include two primary elements, an upper and a sole structure. The upper is formed from a variety of material elements (e.g., textiles, foam, leather, and synthetic leather) that are stitched or adhesively bonded together to form a void on the interior of the footwear for comfortably and securely receiving a foot. An ankle opening through the material elements provides access to the void, thereby facilitating entry and removal of the foot from the void. In addition, a lace is utilized to modify the dimensions of the void and secure the foot within the void.

The sole structure is located adjacent to a lower portion of the upper and is generally positioned between the foot and the ground. In many articles of footwear, including athletic footwear, the sole structure conventionally incorporates an insole, a midsole, and an outsole. The insole is a thin compressible member located within the void and adjacent to a lower surface of the void to enhance footwear comfort. The midsole, which may be secured to a lower surface of the upper and extends downward from the upper, forms a middle layer of the sole structure. In addition to attenuating ground reaction forces (i.e., providing cushioning for the foot), the midsole may limit foot motions or impart stability, for example. The outsole, which may be secured to a lower surface of the midsole, forms the ground-contacting portion of the footwear and is usually fashioned from a durable and wear-resistant material that includes texturing to improve traction.

The conventional midsole is primarily formed from a foamed polymer material, such as polyurethane or ethylvinylacetate, that extends throughout a length and width of the footwear. In some articles of footwear, the midsole may incorporate a variety of additional footwear elements that enhance the comfort or performance of the footwear, including plates, moderators, fluid-filled chambers, lasting elements, or motion control members. In some configurations, any of these additional footwear elements may be located between the midsole and the upper or between the midsole and the outsole, may be embedded within the midsole, or may be encapsulated by the foamed polymer material of the midsole, for example. Although many conventional midsoles are primarily formed from a foamed polymer material, fluid-filled chambers or other non-foam structures may form part of or a majority of some midsole configurations.

SUMMARY

Various features of a fluid-filled chamber, which may be incorporated into articles of footwear and other products, are disclosed below. In one configuration, an article of footwear incorporates a sole structure comprising a midsole and an outsole. The midsole includes a fluid-filled chamber comprising an outer barrier, a tensile structure, and a window portion. The outer barrier defines an interior void. The tensile structure is located within the interior void and is bonded to the outer barrier. The window portion is located around at least part of a periphery of the tensile structure. The window portion has a first area with a first extent of outward protrusion and a second area with a second extent of outward protrusion, the first extent of outward protrusion exceeding the second extent of outward protrusion. The outsole is secured to the midsole and forms at least part of a ground-contacting surface of the footwear. The tensile structure has a first height at a first part adjacent to the first area and a second height at a second part adjacent to the second area, the first height being substantially the same as the second height.

In another configuration, an article of footwear incorporates a sole structure comprising a midsole and an outsole. The midsole includes a fluid-filled chamber comprising an outer barrier, a tensile structure, and a window portion. The outer barrier has an upper portion, an opposite lower portion, and a peripheral edge. The tensile structure is located within the outer barrier and has a first surface secured to the upper portion and a second surface secured to the lower portion. The window portion extends from at least part of the tensile structure to a periphery of the outer barrier. The window portion has a first perimeter at a first position and a second perimeter at a second position, the first perimeter being greater than the second perimeter. The outsole is secured to the midsole and forms at least part of a ground-contacting surface of the footwear. The first perimeter and the second perimeter are located substantially opposite each other on the chamber, and one of the first perimeter and the second perimeter is located on a lateral side of the chamber.

Various features of a method of manufacturing a fluid-filled chamber, which may be incorporated into articles of footwear and other products, are also disclosed below. One method of manufacturing comprises steps of locating, positioning, securing, sealing, forming, and pressurizing. The step of locating includes locating a first polymer layer and a second polymer layer between a first mold portion and a second mold portion. A first surface of the first mold portion and a first surface of the second mold portion cooperatively define a peripheral cavity with a first region and a second region. An inward extent of the first region exceeds an inward extent of the second region. The step of positioning includes positioning a tensile structure between the first polymer layer and the second polymer layer. The step of securing includes securing the tensile structure to the first polymer layer and the second polymer layer. The step of sealing includes sealing the first polymer layer to the second polymer layer to form the chamber. The step of forming includes forming at least part of a peripheral portion of the chamber by drawing a first area of the chamber against the first region of the peripheral cavity, and drawing a second area of the chamber against the second region of the peripheral cavity. The step of pressurizing includes pressurizing the chamber.

Another method of manufacturing comprises steps of locating, positioning, compressing, forming, pressurizing, and incorporating. The step of locating includes locating a first polymer layer and a second polymer layer between a pair of mold portions. Each mold portion has a molding surface. At least one of the molding surfaces including a peripheral indentation with a first region having a first inward extent and a second region having a second inward extent, the first inward extent exceeding the second inward extent. The step of positioning includes positioning a tensile structure between the mold portions. The step of compressing includes compressing the mold portions together to secure the tensile structure to each of the polymer layers, to seal the polymer layers to each other, and to form a chamber. The step of forming includes forming at least part of a peripheral portion of the chamber by drawing a first area of the chamber against the first region of the peripheral indentation, and drawing a second area of the chamber against the second region of the peripheral indentation. The step of pressurizing includes pressurizing the chamber to form a window portion around at least part of a periphery of the tensile structure, the window portion having a first area with a first extent of outward protrusion and a second area with a second extent of outward protrusion, the first extent of outward protrusion exceeding the second extent of outward protrusion. The step of incorporating includes incorporating the chamber into the article of footwear.

The advantages and features of novelty characterizing aspects of the invention are pointed out with particularity in the appended claims. To gain an improved understanding of the advantages and features of novelty, however, reference may be made to the following descriptive matter and accompanying Figures that describe and illustrate various configurations and concepts related to the invention.

FIGURE DESCRIPTIONS

The foregoing Summary and the following Detailed Description will be better understood when read in conjunction with the accompanying Figures.

FIGS. 6A-6C are cross-sectional views of the chamber, as defined by section lines 6A-6A through 6C-6C in FIG. 4.

FIG. 7 is a perspective view of a mold that may be utilized for a process for manufacturing the chamber.

FIGS. 8A-8E are side elevational views of the mold depicting steps in the process for manufacturing the chamber.

FIGS. 11A-11L are schematic cross-sectional views corresponding with FIG. 9E and depicting steps in additional processes for manufacturing the chamber

DETAILED DESCRIPTION

The following discussion and accompanying Figures disclose various configurations of fluid-filled chambers and methods for manufacturing the chambers. Although the chambers are disclosed with reference to footwear having a configuration that is suitable for running, concepts associated with the chambers may be applied to a wide range of athletic footwear styles, including basketball shoes, cross-training shoes, football shoes, golf shoes, hiking shoes and boots, ski and snowboarding boots, soccer shoes, tennis shoes, and walking shoes, for example. Concepts associated with the chambers may also be utilized with footwear styles that are generally considered to be non-athletic, including dress shoes, loafers, and sandals. In addition to footwear, the chambers may be incorporated into other types of apparel and athletic equipment, including helmets, gloves, and protective padding for sports such as football and hockey. Similar chambers may also be incorporated into cushions and other compressible structures utilized in household goods and industrial products. Accordingly, chambers incorporating the concepts disclosed herein may be utilized with a variety of products.

General Footwear Structure

Figure 1:
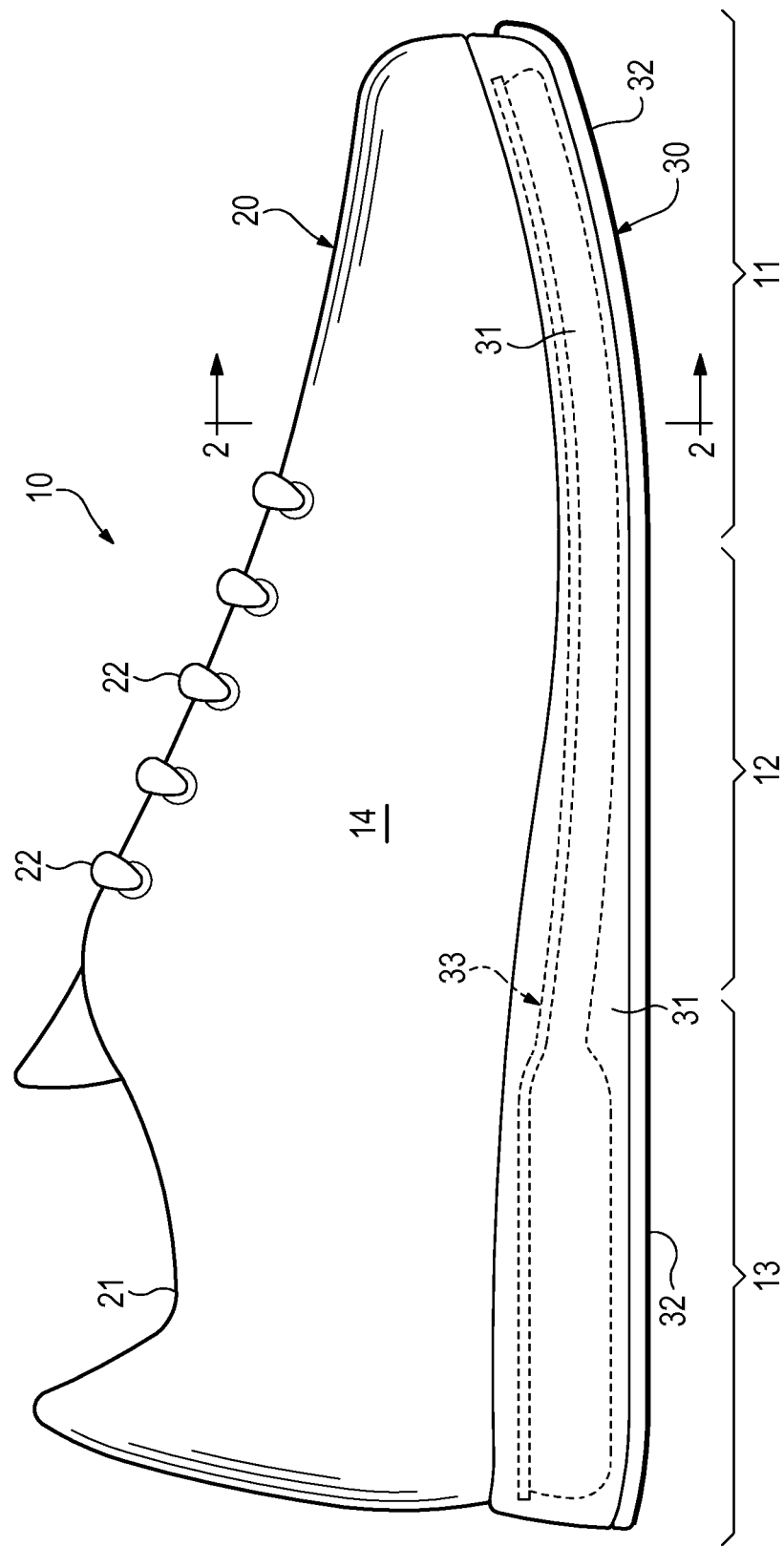
FIG. 1 is a lateral side elevational view of an article of footwear incorporating a fluid-filled chamber.
Figure 2:
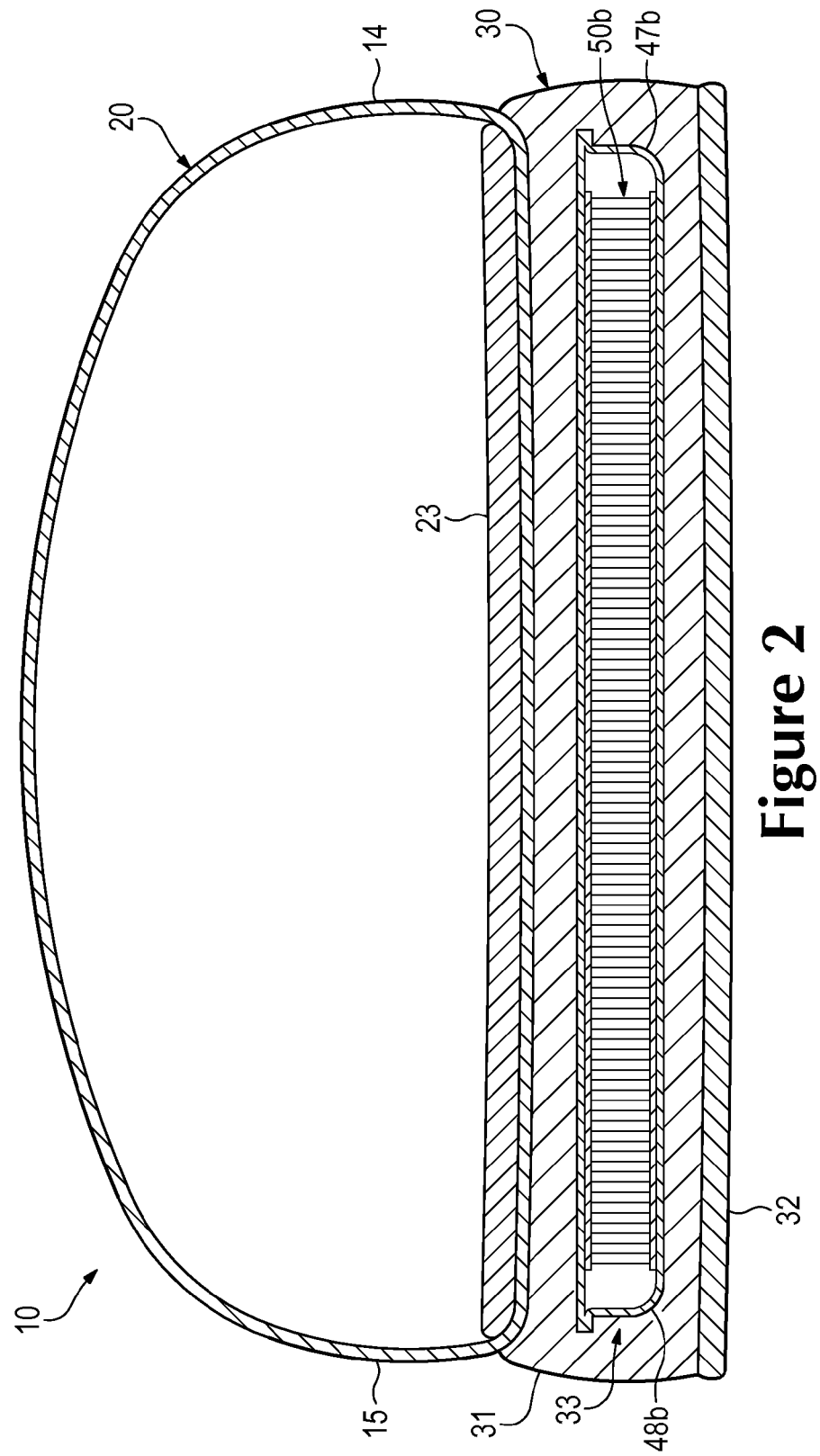
FIG. 2 is a cross-sectional view of the article of footwear, as defined by section line 2-2 in FIG. 1.
Figure 3:
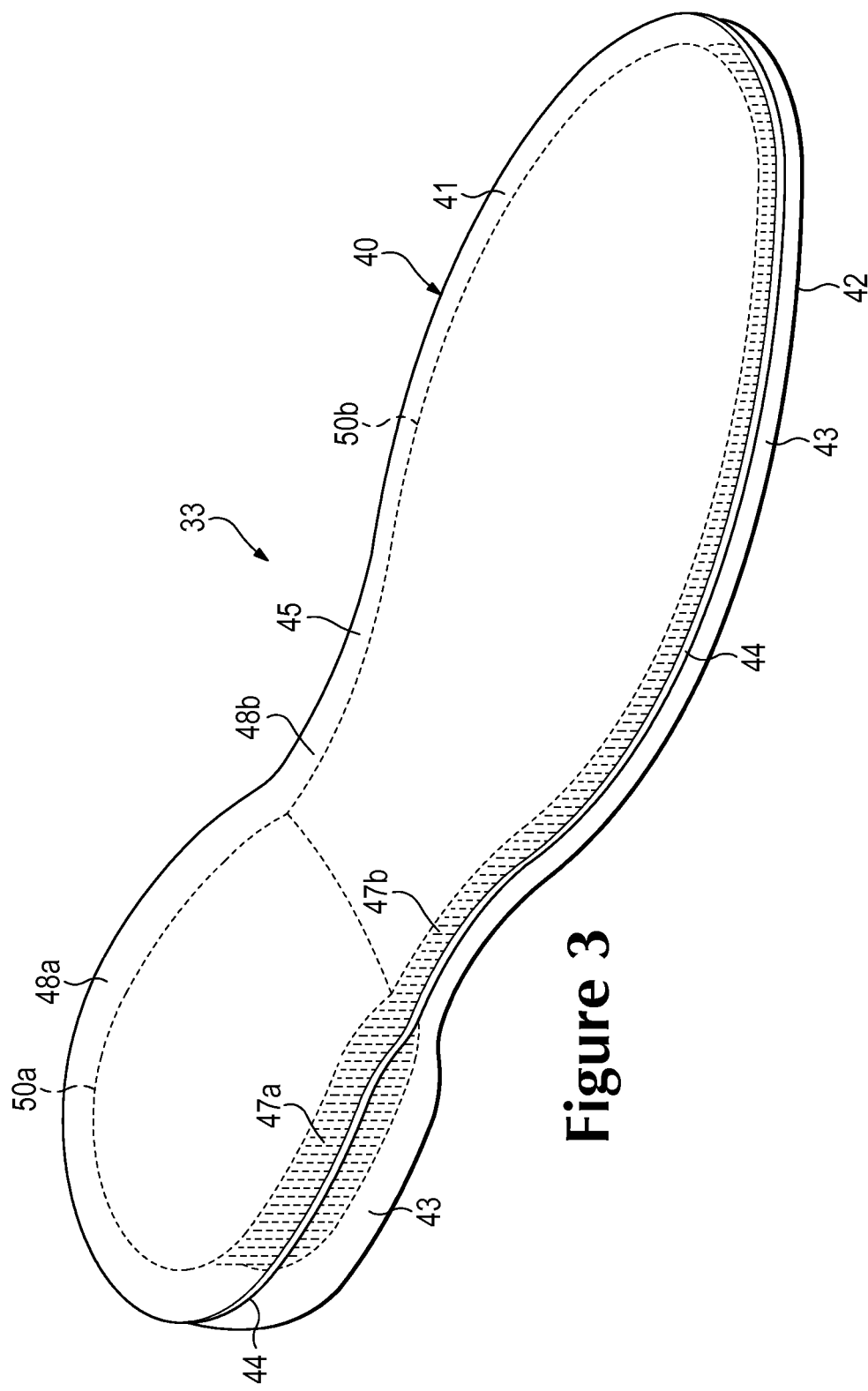
FIG. 3 is a perspective view of the chamber.
Figure 4:
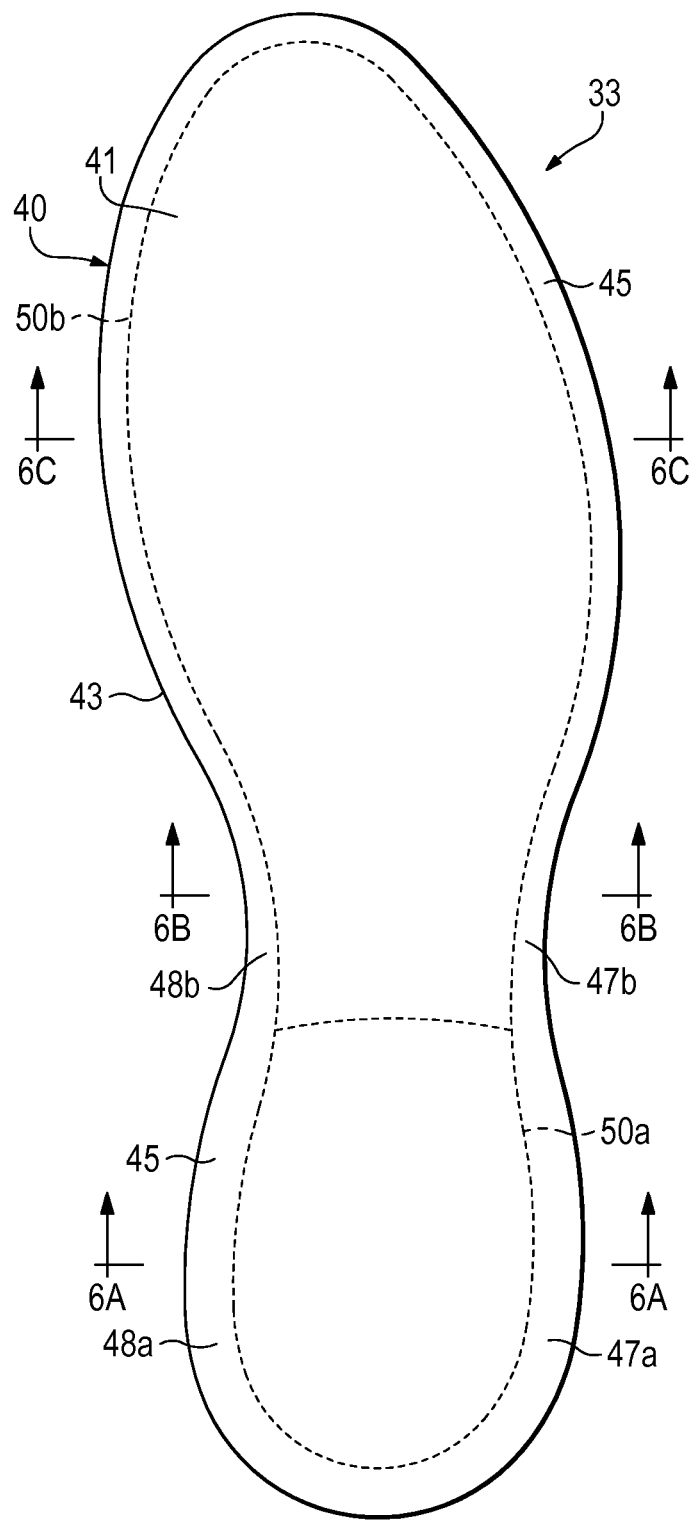
FIG. 4 is a top plan view of the chamber.
Figure 5:
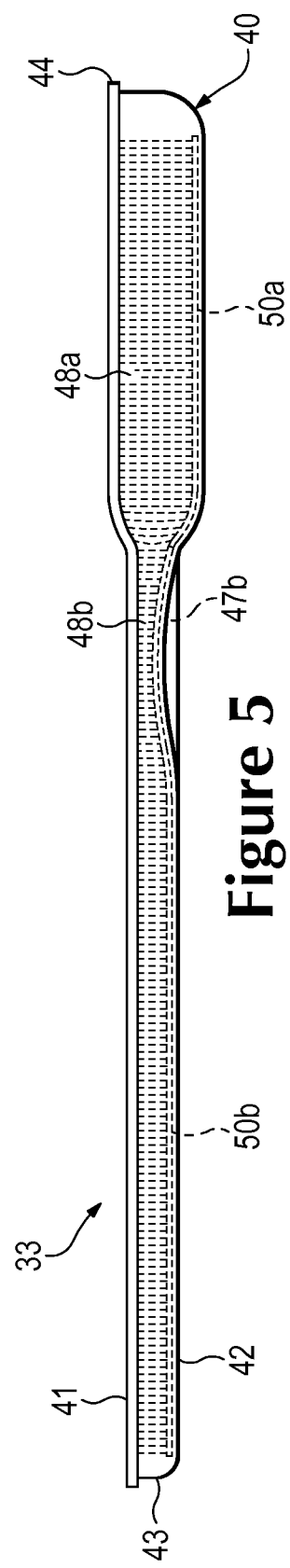
FIG. 5 is a medial side elevational view of the chamber.

An article of footwear 10 is depicted in FIGS. 1-2 as including an upper 20 and a sole structure 30. For reference purposes, footwear 10 may be divided into three general regions: a forefoot region 11, a midfoot region 12, and a heel region 13, as shown in FIG. 1. Forefoot region 11 generally includes portions of footwear 10 corresponding with the toes and the joints connecting the metatarsals with the phalanges. Midfoot region 12 generally includes portions of footwear 10 corresponding with the arch area of the foot. Heel region 13 generally includes portions of footwear 10 corresponding with rear portions of the foot, including the calcaneus bone. Regions 11-13 are not intended to demarcate precise areas of footwear 10. Rather, regions 11-13 are intended to represent general areas of footwear 10 to aid in the following discussion. In addition to being applied to footwear 10, regions 11-13 may also be applied to upper 20, sole structure 30, and individual elements thereof. Footwear 10 also includes a lateral side 14 and a medial side 15, as shown in FIGS. 1-2. Lateral side 14 and medial side 15 also extend through each of regions 11-13 and correspond with opposite sides of footwear 10. As with regions 11-13, sides 14 and 15 represent general areas of footwear 10 to aid in the following discussion, and may also be applied to upper 20, sole structure 30, and individual elements thereof in addition to being applied to footwear 10.

Upper 20 is depicted as having a substantially conventional configuration incorporating a plurality of material elements (e.g., textile, foam, leather, and synthetic leather) that are stitched, adhered, bonded, or otherwise joined together to form an interior void for securely and comfortably receiving a foot. The material elements may be selected and located with respect to upper 20 in order to selectively impart properties of durability, air-permeability, wear-resistance, flexibility, and comfort, for example. An ankle opening 21 in heel region 13 provides access to the interior void. In addition, upper 20 may include a lace 22 that is utilized in a conventional manner to modify the dimensions of the interior void, thereby securing the foot within the interior void and facilitating entry and removal of the foot from the interior void. Lace 22 may extend through apertures in upper 20, and a tongue portion of upper 20 may extend between the interior void and lace 22. Upper 20 may also incorporate a sockliner 23 that is located within the void in upper 20 and adjacent a plantar (i.e., lower) surface of the foot to enhance the comfort of footwear 10. Given that various aspects of the present application primarily relate to sole structure 30, upper 20 may exhibit the general configuration discussed above or the general configuration of practically any other conventional or non-conventional upper. Accordingly, the overall structure of upper 20 may vary significantly.

Sole structure 30 is secured to upper 20 and has a configuration that extends between upper 20 and the ground. In effect, therefore, sole structure 30 is located to extend between the foot and the ground. In addition to attenuating ground reaction forces (i.e., providing cushioning for the foot), sole structure 30 may provide traction, impart stability, and limit various foot motions, such as pronation. The primary elements of sole structure 30 are a midsole 31 and an outsole 32. Midsole 31 may incorporate a polymer foam material, such as polyurethane or ethylvinylacetate. Midsole 31 may also incorporate a fluid-filled chamber 33. In addition to the polymer foam material and chamber 33, midsole 31 may incorporate one or more other footwear elements that enhance the comfort, performance, or ground reaction force attenuation properties of footwear 10, including plates, moderators, lasting elements, or motion control members.

Outsole 32, which may be absent in some configurations of footwear 10, is secured to a lower surface of midsole 31 and forms at least part of a ground-contacting surface of footwear 10. Outsole 32 may be formed from a rubber material that provides a durable and wear-resistant surface for engaging the ground. In addition, outsole 32 may also be textured to enhance the traction (i.e., friction) properties between footwear 10 and the ground. In further configurations, and depending upon the manner in which midsole 31 incorporates the polymer foam material, chamber 33, or both, outsole 32 may be secured to the polymer foam material alone, to chamber 33 alone, or to both the polymer foam material and chamber 33.

As incorporated into footwear 10, chamber 33 has a shape that extends through substantially all of footwear 10, from forefoot region 11 to heel region 13 and also from lateral side 14 to medial side 15, thereby having a shape that corresponds with an outline of the foot and extends under substantially all of the foot. Accordingly, when the foot is located within upper 20, chamber 33 extends under the foot in order to attenuate ground reaction forces that are generated when sole structure 30 is compressed between the foot and the ground during various ambulatory activities, such as running and walking. In other configurations, chamber 33 may extend through less than all of footwear 10. For example, chamber 33 may extend only through forefoot region 11, or only through midfoot region 12, or only through heel region 13. Alternatively, chamber 33 may extend only through lateral side 14 of footwear 10, or only through medial side 15 of footwear 10. Chamber 33 may also extend through any combination of regions and sides. That is, in various configurations, chamber 33 may extend through any portion of footwear 10.

As depicted in FIGS. 1-2, chamber 33 is positioned substantially surrounded by or entirely encapsulated within a polymer foam material of midsole 31 and is secured to the polymer foam material. In some configurations, however, chamber 33 may be only partially encapsulated by a polymer foam material of midsole 31, or may be above a polymer foam material of midsole 31, or may be below a polymer foam material of midsole 31. In other configurations, chamber 33 may be secured to a plate or other structure within midsole 31. In further configurations, the polymer foam material of midsole 31 may be absent and chamber 33 may be secured to both upper 20 and outsole 32. Additionally, in various configurations, chamber 33 may be secured to outsole 32. Accordingly, the overall shape of chamber 33 and the manner in which chamber 33 is incorporated into footwear 10 may vary significantly.

Although chamber 33 is depicted and discussed as being a sealed chamber within footwear 10, chamber 33 may also be a component of a fluid system within footwear 10. More particularly, pumps, conduits, and valves may be joined with chamber 33 to provide a fluid system that pressurizes chamber 33 with air from the exterior of footwear 10 or a reservoir within footwear 10. As examples, chamber 33 may be utilized in combination with any of the fluid systems disclosed in U.S. Pat. No. 7,210,249 to Passke, et al. and U.S. Pat. No. 7,409,779 to Dojan, et al.

Chamber Configuration

Chamber 33 is depicted individually in FIGS. 3-6C in an initial configuration that is suitable for footwear applications. Chamber 33 has a contoured configuration, and when incorporated into footwear 10, chamber 33 corresponds with substantially all of footwear 10. When the foot is located within upper 20, chamber 33 extends under the foot in order to attenuate ground reaction forces that are generated when sole structure 30 is compressed between the foot and the ground during various ambulatory activities, such as running and walking. In other configurations, chamber 33 may have an alternate extent, such as extending under a forefoot area of the foot, or a heel area of the foot, for example. Additionally, although chamber 33 is depicted as being within a polymer foam material of midsole 31, in some configurations of footwear 10, chamber 33 may form at least part of a sidewall of midsole 31.

The primary elements of chamber 33 are an outer barrier 40 and tensile structures 50a and 50b. Barrier 40 (a) forms an exterior of chamber 33, (b) defines an interior void that receives both a pressurized fluid and tensile structures 50a-50b, and (c) provides a durable sealed barrier for retaining the pressurized fluid within chamber 33. The polymer material of barrier 40 includes (a) a first barrier portion 41 oriented toward upper 20 that may form an upper portion of barrier 40, (b) an opposite second barrier portion 42 oriented toward outsole 32 that may form a lower portion of barrier 40, and (c) a peripheral edge 43 that extends around a periphery of chamber 33 and between barrier portions 41 and 42.

As depicted in FIGS. 3-6C, tensile structures 50a-50b are located within the interior void and may include tensile members such as textile tensile members. In other configurations, tensile structures may include elements that are not textile tensile members, such as any of the tether elements disclosed in U.S. patent application Ser. No. 12/630,642 to Peyton and U.S. patent application Ser. No. 12/777,167 to Peyton. In some configurations, tensile member 50 may be formed from, or be formed to include a foam tensile member such as any of the foam tensile members disclosed in U.S. Pat. No. 7,131,218 to Schindler, U.S. Pat. No. 7,588,654 to Schindler et al., and U.S. Pat. No. 7,591,919 to Schindler et al.

Tensile structures 50a-50b may include upper tensile layers 51a and 51b, opposite lower tensile layers 52a and 52b, and pluralities of connecting members 53a and 53b, respectively, that extend between tensile layers 51a-51b and 52a-52b. Upper tensile layers 51a-51b are secured to inner surfaces of first barrier portion 41 and lower tensile layers 52a-52b are secured to inner surfaces of second barrier portion 42. Connecting members 53a-53b may include yarns, fibers, or filaments formed of a variety of materials, and may be positioned across lengths and widths of tensile structures 52a-52b at relatively sparse densities, relatively packed densities, or any other densities. Although discussed in greater detail below, either adhesive bonding or thermobonding may be utilized to secure tensile structures 50a-50b to barrier 40. Tensile structures 50a-50b may be located in different areas of chamber 33 and may have different heights.

In addition, window portion 45 of chamber 33 is located around the peripheries of tensile structures 50a-50b, extending from at least part of each of tensile structures 50a-50b to a periphery of outer barrier 40. Each of first window area 47a and second window area 48a extends from at least part of tensile structure 50a to a periphery of outer barrier 40, while each of first window area 47b and second window area 48b extends from at least part of the periphery of tensile structure 50b to a periphery of outer barrier 40. In addition, first window areas 47a-47b are positioned on lateral side 14 and within midfoot region 12 of chamber 33, and second window areas 48a-48b are positioned on medial side 15 and within midfoot region 12 of chamber 33.

Each of window areas 47a-47b and 48a-48b may have an extent of outward protrusion, and the extent of outward protrusion between various window areas 47a-47b and 48a-48b may differ. For example, one or more window areas 47a-47b and 48a-48b may have a greater extent of outward protrusion than one or more other window areas 47a-47b and 48a-48b.

At the same time, the extent of outward protrusion of window areas 47a-47b and 48a-48b may be substantially proportional to dimensions corresponding with tensile structures 50a and 50b, respectively, such as the heights of tensile structures 50a and 50b.

A wide range of polymer materials may be utilized for barrier 40. In selecting materials for barrier 40, engineering properties of the materials (e.g., tensile strength, stretch properties, fatigue characteristics, dynamic modulus, and loss tangent) as well as the ability of the materials to prevent the diffusion of the fluid contained by barrier 40 may be considered. When formed of thermoplastic urethane, for example, barrier 40 may have a thickness of approximately 1.0 millimeter, but the thickness may range from less than 0.25 to more than 2.0 millimeters, for example. In addition to thermoplastic urethane, examples of polymer materials that may be suitable for barrier 40 include polyurethane, polyester, polyester polyurethane, and polyether polyurethane. Barrier 40 may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein a center layer is formed of ethylene-vinyl alcohol copolymer, layers adjacent to the center layer are formed of thermoplastic polyurethane, and outer layers are formed of a regrind material of thermoplastic polyurethane and ethylene-vinyl alcohol copolymer. Another suitable material for barrier 40 is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk, et al.

A variety of processes may be utilized to manufacture chamber 33. In general, the manufacturing processes involve (a) securing a pair of polymer sheets, which form barrier portions 41 and 42 as well as peripheral edge 43, to opposite sides of tensile structures 50a-50b (i.e., to tensile layers 51a-51b and 52a-52b) and (b) forming a peripheral bond 44 that joins a periphery of the polymer sheets and may extend around peripheral edge 43. Peripheral bond 44 is depicted as being adjacent to the upper surface of chamber 33, but may be positioned between the upper and lower surfaces of chamber 33, or may be adjacent to the lower surface of chamber 33. The thermoforming process may also (a) locate tensile structures 50a-50b within chamber 33, and (b) bond tensile structures 50a-50b to each of barrier portions 41 and 42. Although substantially all of the thermoforming process may be performed with a mold, as described in greater detail below, each of the various parts or steps of the process may be performed separately in forming chamber 33. That is, a variety of other methods may be utilized to form chamber 33.

In order to facilitate bonding between tensile structures 50a-50b and barrier 40, polymer supplemental layers may be applied to any of tensile layers 51a-51b and 52a-52b. When heated, the supplemental layers soften, melt, or otherwise begin to change state so that contact with barrier portions 41 and 42 induces material from each of barrier 40 and the supplemental layers to intermingle or otherwise join with each other. Upon cooling, therefore, the supplemental layers are permanently joined with barrier 40, thereby joining tensile structures 50a-50b with barrier 40. In some configurations, thermoplastic threads or strips may be present within tensile layers 51a-51b and 52a-52b to facilitate bonding with barrier 40, as disclosed in U.S. Pat. No. 7,070,845 to Thomas, et al., or an adhesive may be utilized to secure barrier 40 to any of tensile structures 50a-50b.

Following the thermoforming process, or as part of the thermoforming process, a fluid may be injected into the interior void and pressurized between zero and three-hundred-fifty kilopascals (i.e., approximately fifty-one pounds per square inch) or more. The pressurized fluid exerts an outward force upon barrier 40, which tends to separate barrier portions 41 and 42. Tensile structures 50a-50b, however, are secured to each of barrier portions 41 and 42 in order to impose an intended shape upon chamber 33 when pressurized. More particularly, connecting members 53a-53b extending across the interior void are placed in tension by the outward force of the pressurized fluid upon barrier 40, thereby preventing barrier 40 from expanding outward and causing chamber 33 to retain an intended shape. Whereas peripheral bond 44 joins the polymer sheets to form a seal that prevents the fluid from escaping, tensile structures 50a-50b prevent barrier 40 from expanding outward or otherwise distending due to the pressure of the fluid. That is, tensile structures 50a-50b effectively limit the expansion of chamber 33 to retain an intended shape of barrier portions 41 and 42.

The lengths of connecting members within each plurality of connecting members 53a-53b are substantially constant throughout tensile structures 50a-50b, which imparts the parallel configuration to each of tensile layers 51a-51b and 52a-52b. In some configurations, however, the lengths of connecting members within at least one plurality of connecting members 53a-53b may vary to impart a contoured configuration to chamber 33. For example, chamber 33 may taper or may form a depression due to differences in the lengths of connecting members within any plurality of connecting members 53a-53b. Examples of contoured tensile structures are disclosed in U.S. patent application Ser. No. 12/123,612 to Dua and Ser. No. 12/123,646 to Rapaport, et al. Additionally, tensile structures 50a-50b may include tensile members such as textile tensile members. That is, part of at least one of tensile structures 50a-50b may be formed of a textile tensile member. Textile tensile members may be cut or formed from a larger element of a spacer textile. Alternately, each of tensile elements 51a-51b and 52a-52b may be formed to have a variety of configurations through, for example, a flat-knitting process, as in U.S. patent application Ser. No. 12/123,612 to Dua.

Suitably configured, tensile structures 50a-50b may have any of a range of configurations, including the range of configurations disclosed in U.S. patent application Ser. No. 12/123,612 to Dua, U.S. patent application Ser. No. 12/123,646 to Rapaport, et al., and U.S. patent application Ser. No. 12/630,642 to Peyton. In some configurations, chamber 33 may incorporate a valve or other structure that permits the individual to adjust the pressure of the fluid. Additionally, chamber 33 may be incorporated into a fluid system, similar to a fluid system disclosed in U.S. Pat. No. 7,409,779 to Dojan, et al., that varies the pressure within barrier 40 depending upon, for example, the running style or weight of the wearer.

As depicted in FIGS. 3-6C, chamber 33, as well as tensile structures 50a-50b within chamber 33, extend substantially throughout footwear 10. Tensile structures 50a-50b are located in different areas of chamber 33, or in different areas of barrier 40 that forms an exterior of chamber 33 and defines an interior void within chamber 33. Tensile structure 50a is located in a first area of chamber 33, or in a first area of barrier 40 and within the interior void. Tensile structure 50b is located in a second area of chamber 33, or in a second area of barrier 40 and within the interior void. The first area and second area are in fluid communication with each other. Additionally, tensile structure 50a is substantially located in heel region 13 of footwear 10, and tensile structure 50b is substantially located in midfoot region 12 and forefoot region 11 of footwear 10. That is, tensile structure 50b is forward of tensile structure 50a.

Additionally, each of tensile structures 50a-50b may have a different height than the other tensile structures 50a-50b. For example, as depicted in FIGS. 3-6C, tensile structure 50a has a height greater than tensile structure 50b. In turn, the relative locations and differences of height of tensile structure 50a-50b impart a contoured configuration to footwear 10. As depicted in FIGS. 3-6C, the relative locations and differences of height of tensile structures 50a-50b impart contours including a taper from heel region 13 to forefoot region 11.

As depicted in FIGS. 3-6C, tensile structure 50a has a height greater than tensile structure 50b. Correspondingly, first window area 47a and second window area 48a have greater extents of outward protrusion than first window area 47b and second window area 48b. In contrast, the height at all parts of tensile structure 50b at all parts at which it is adjacent to window portion 45 is substantially the same. That is, a height of tensile structure 50b at a first part adjacent to first window area 47b is substantially the same as a height of tensile structure 50b at a second part adjacent to second window area 48b. In some configurations, tensile structure 50b may include a first tensile member at the first part and a second tensile member at the second part, and both the first tensile member and the second tensile member may have substantially the same height.

At the same time, the extent of outward protrusion of first window area 47b, located in midfoot region 12 and lateral side 14 of footwear 10, exceeds the extent of outward protrusion of second window area 48b, located in midfoot region 12 and medial side 15 of footwear 10. The extent of outward protrusion of a particular window area may be a lateral spacing between a tensile structure and a periphery of chamber 33. Alternatively, the extent of outward protrusion of a particular window area may be an overall extent, such as an area, in cross-section, of a space bounded by a tensile structure and by an outer barrier, or a volume of a portion of an interior void bounded by an outer barrier and a portion of a tensile structure located within the outer barrier.

In some configurations, window portion 45 may have a first perimeter at a first position, and a second perimeter at a second position, the first perimeter being greater than the second perimeter. Furthermore, the first perimeter and the second perimeter may be located substantially opposite each other on the chamber. For example, as depicted in FIGS. 3-6C, window portion 45 has a first perimeter in first window area 47b and a second perimeter in second window area 48b, and the first perimeter is greater than the second perimeter.

As depicted in FIGS. 3-6C, first window area 47b and second window area 48b are located within midfoot region 12 and are substantially opposite each other on chamber 33. In other configurations, first window areas and second window areas may be located in other regions of footwear 10, such as heel region 13 or forefoot region 11, while still being substantially opposite each other on chamber 33.

As depicted in FIGS. 3-6C, first window area 47b having the first perimeter is located on lateral side 14 of footwear 10, and second window area 48b having the second perimeter is located on medial side 15 of footwear 10, the first perimeter being greater than the second perimeter. In other configurations, a window area located on medial side 15 of footwear 10 may have the first perimeter, and a window area located on lateral side 14 of footwear 10 may have the second perimeter, the first perimeter being greater than the second perimeter.

In some configurations, peripheral edge 43 of chamber 33 may be spaced from a tensile structure by a first distance in a first window area and by a second distance in a second window area, the first distance being greater than the second distance. For example, as depicted in FIGS. 3-6C, peripheral edge 43 is spaced from tensile structure 50b by a first distance in first window area 47b, and is spaced from tensile structure 50b by a second distance in second window area 48b, and the first distance is greater than the second distance.

Although depicted in FIGS. 3-6C as including two tensile structures 50a-50b, various configurations of chamber 33 may include a different number of tensile structures. For example, in some configurations, chamber 33 may include only one tensile structure, whereas in other configurations, chamber 33 may include more than two tensile structures. Accordingly, in various configurations, chamber 33 may include any number of tensile structures, each of which may have any height, or any of the various configurations described above.

In other words, in various configurations, two or more tensile structures having various heights may be incorporated into different areas of a chamber 33. One or more tensile structures may be located in a heel region, or in a midfoot region, or in a forefoot region of chamber 33, and one or more other tensile structures may be located in different areas of chamber 33.

The various configurations of chamber 33 described above may be incorporated into an article of footwear or any of a variety of other products, such as apparel, athletic equipment, cushions, and other compressible structures. By incorporating a plurality of tensile structures having different heights into different areas of chamber 33, one or more properties of chamber 33 may be altered, such as a flexibility, stiffness, rigidity, tensile response, compressibility, or force attenuation property of chamber 33. Additionally, an asymmetric medio-lateral shape may be imparted to chamber 33 without use of a tensile structure that is itself tapered or contoured.

Manufacturing Process

Although a variety of manufacturing processes may be utilized to form chamber 33, an example of a suitable thermoforming process will now be discussed. With reference to FIG. 7, a mold 60 that may be utilized in the thermoforming process is depicted as including an upper mold portion 61 and a lower mold portion 62. Mold 60 is utilized to form chamber 33 from a pair of polymer sheets that are molded and bonded to define barrier portions 41 and 42 as well as peripheral edge 43, and the thermoforming process secures tensile structures 50a-50b within barrier 40. More particularly, mold 60 (a) imparts shape to one of the polymer sheets in order to form first barrier portion 41, (b) imparts shape to the other of the polymer sheets in order to form second barrier portion 42, (c) imparts shape to the polymer sheets in order to form peripheral edge 43 and to form peripheral bond 44 to seal or otherwise join a periphery of the polymer sheets, (d) locates tensile structures 50a-50b within chamber 33, and (e) bonds tensile structures 50a-50b to each of barrier portions 41 and 42.

Additionally, various surfaces of the first mold portion and the second mold portion may define a peripheral cavity, or peripheral indentation, having a first peripheral region and a second peripheral region, in which an inward extent of the first peripheral region is greater than an inward extent of the second peripheral region. As depicted in FIGS. 7-9E, a molding surface of second mold portion 62 defines peripheral cavity 63, while a molding surface of first mold portion is substantially flat. Peripheral cavity 63 includes a first peripheral region 67 and a second peripheral region 68. First peripheral region 67 may correspond with a lateral side and a midfoot region of the chamber to be formed in the mold, while second peripheral region 68 may correspond with a medial side and a midfoot region of the chamber to be formed in the mold.

The inward extent of first peripheral region 67 exceeds the inward extent of second peripheral region 68. The inward extent of a particular peripheral region may be a distance perpendicular to the surface of each mold portion mold oriented to face the polymer sheets. That is, the inward extent may be a distance extending away from the face of each mold portion that includes the surfaces against which the polymer sheets will be drawn to form chamber 33. Alternatively, the inward extent of a particular peripheral region may be an overall extent, such as an area, in cross-section, of an inward protrusion, or a volume of an inward protrusion.

In this example manufacturing process, each of tensile structures 50a-50b may be a textile tensile member. In other manufacturing processes, each of tensile structures 50a-50b may include one or more textile tensile members, and may also include one or more elements that are not textile tensile members, such as tether elements.

In preparation for the manufacturing process, various elements forming chamber 33 may be obtained and organized. For example, an upper polymer layer 71 and a lower polymer layer 72, which form barrier 40, may be cut to a desired shape. Tensile structures 50a-50b are in a compressed state at this stage of the manufacturing process, wherein textile layers 51a-51b and 52a-52b lie adjacent to each other and connecting members 53a-53b are in a collapsed state. Upon completion of the manufacturing process, when chamber 33 is pressurized, tensile structures 50a-50b are placed in tension, which spaces textile layers 51a-51b and 52a-52b from each other and induces connecting members 53a-53b to straighten.

In manufacturing chamber 33, one or more of upper polymer layer 71, lower polymer layer 72, and tensile structures 50a-50b are heated to a temperature that facilitates bonding between the components. Depending upon the specific materials utilized for tensile structures 50a-50b and polymer layers 71 and 72, which form barrier 40, suitable temperatures may range from 120 to 200 degrees Celsius (248 to 392 degrees Fahrenheit) or more. Various radiant heaters or other devices may be utilized to heat the components of chamber 33. In some manufacturing processes, mold 60 may be heated such that contact between mold 60 and the components of chamber 33 raises the temperature of the components to a level that facilitates bonding.

Figure 8B:
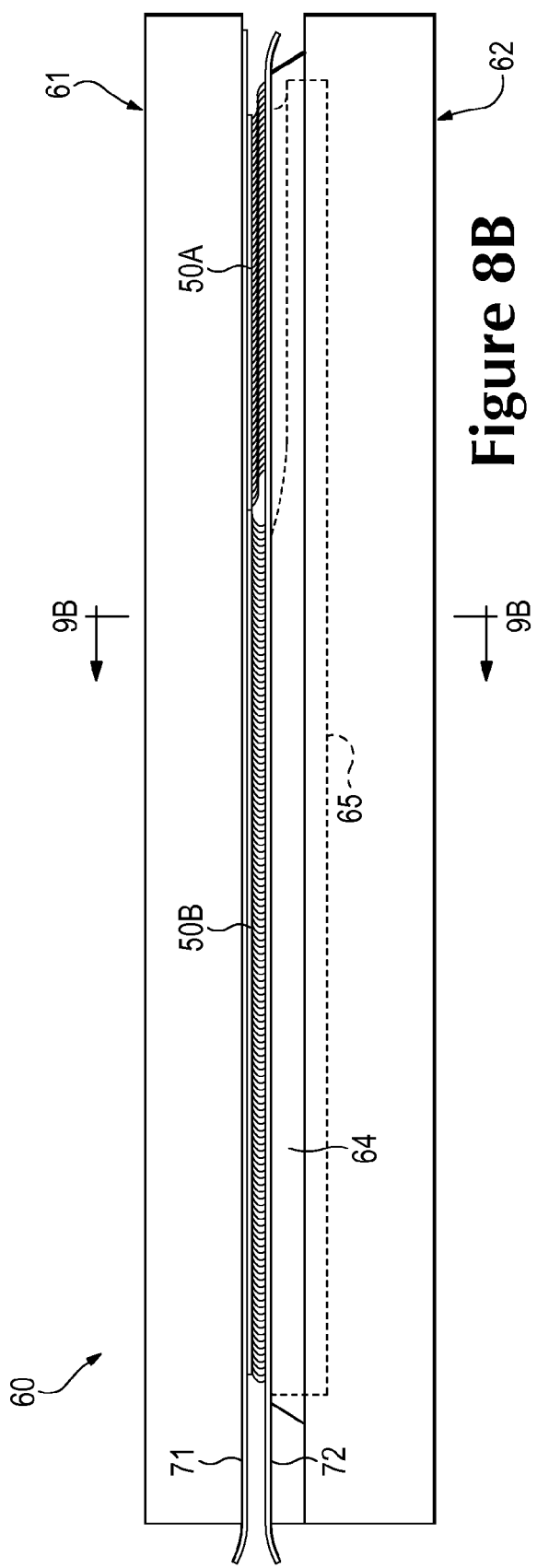
Figure 9A:
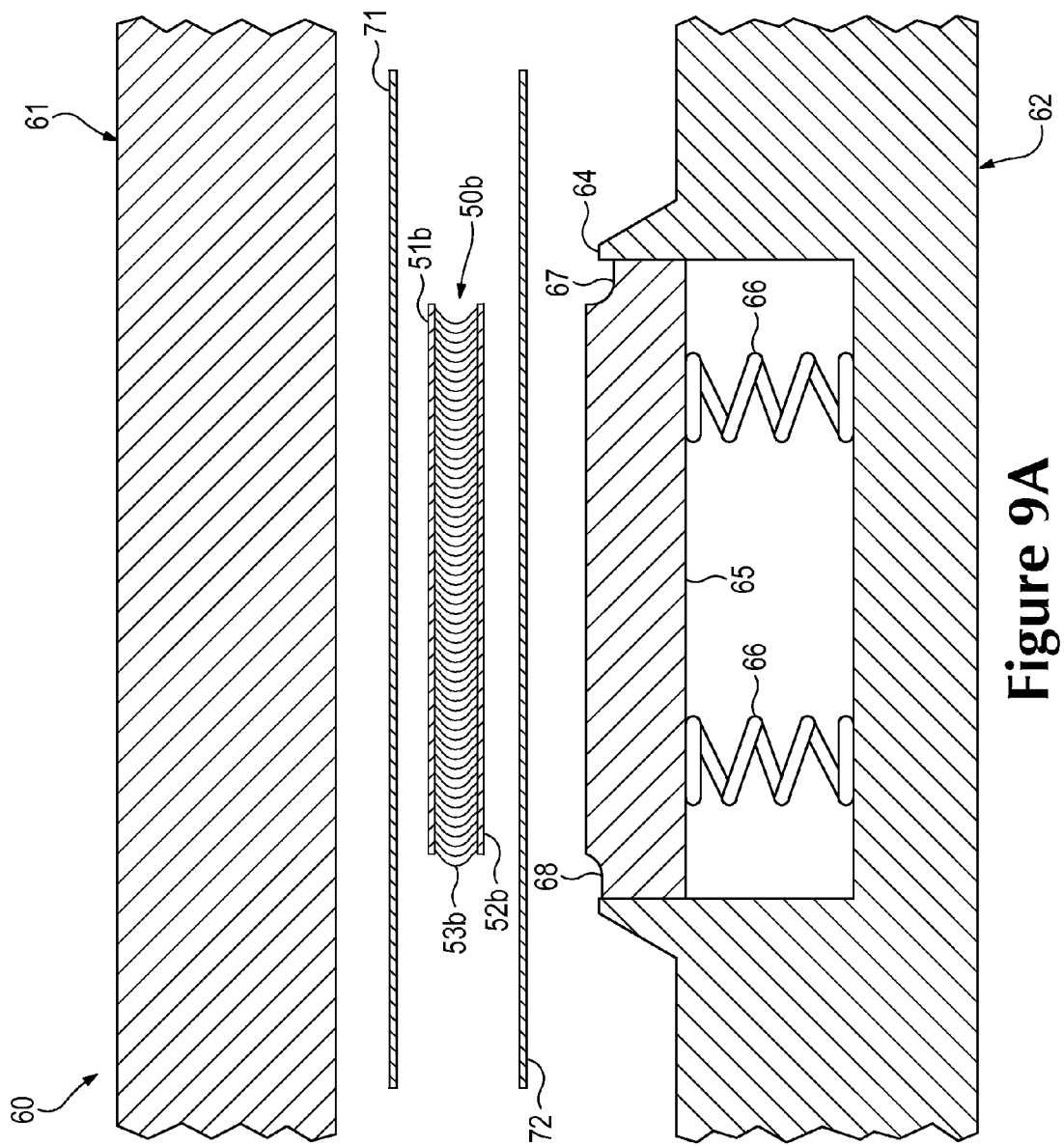
FIGS. 9A-9E are schematic cross-sectional views of the mold, as defined by section lines 9A-9A through 9E-9E in FIGS. 8A-8E, depicting steps in the process for manufacturing the chamber.
Figure 9B:
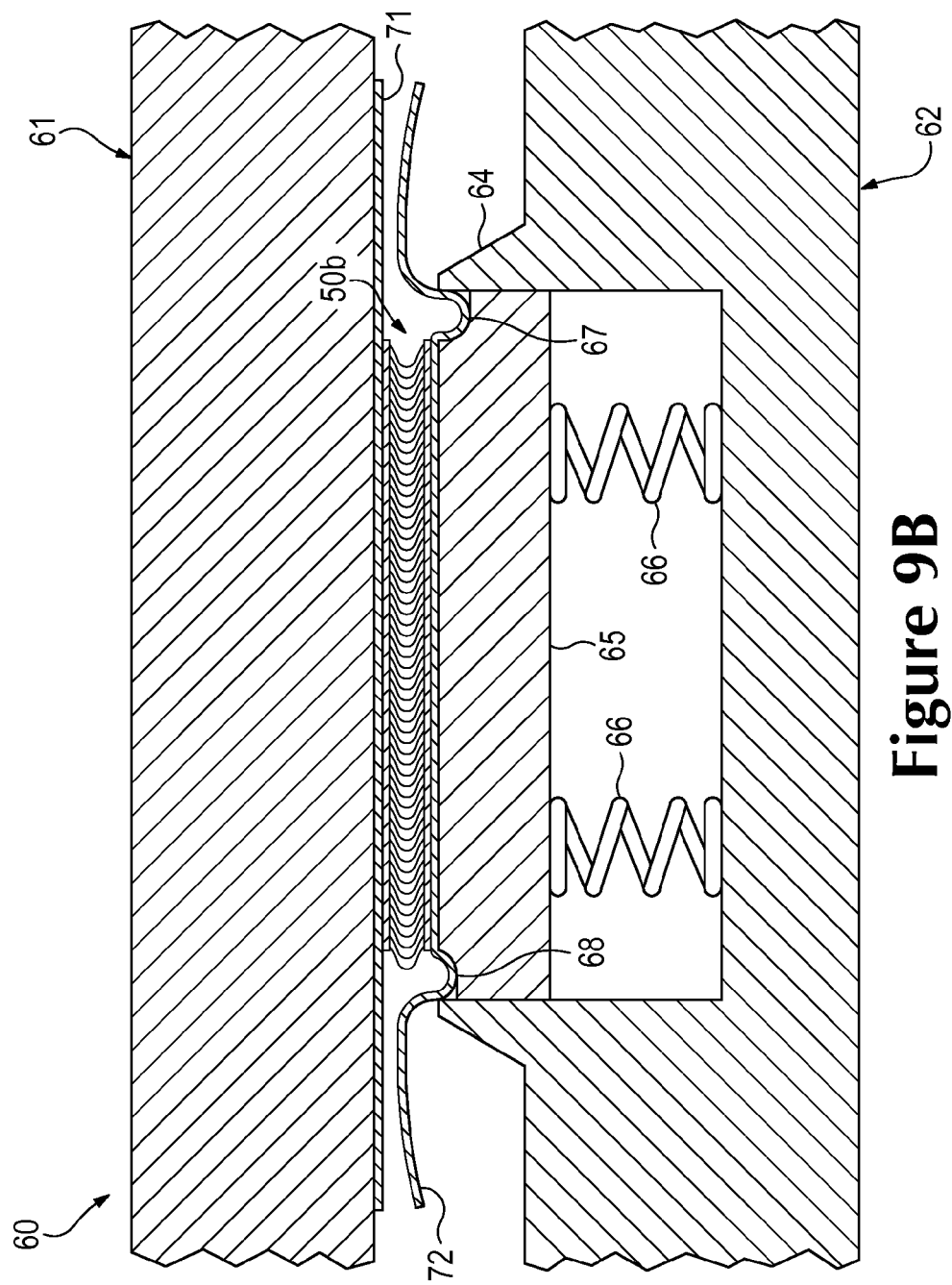

Following heating, the components of chamber 33 are located between mold portions 61 and 62, as depicted in FIGS. 8A and 9A. In order to properly position the components, a shuttle frame or other device may be utilized. Once positioned, mold portions 61 and 62 translate toward each other and begin to close upon the components such that (a) upper mold portion 61 contacts upper polymer layer 71, (b) ridge 64 of lower mold portion 62 contacts lower polymer layer 72, and (c) polymer layers 71 and 72 begin bending around tensile structures 50a-50b so as to extend into a cavity within mold 60, as depicted in FIGS. 8B and 9B. The components are thus located relative to mold 60 and initial shaping and positioning has occurred.

At the stage depicted in FIGS. 8B and 9B, air may be partially evacuated from the area around polymer layers 71 and 72 through various vacuum ports in mold portions 61 and 62. The purpose of evacuating the air is to draw polymer layers 71 and 72 into contact with the various contours of mold 60. This ensures that polymer layers 71 and 72 are properly shaped in accordance with the contours of mold 60. At least part of a peripheral portion or window portion of the chamber may be formed by drawing a first part of polymer layers 71 and 72 against first peripheral region 67, and by drawing a second part of polymer layers 71 and 72 against second peripheral region 68. For example, first window area 47b may be formed by drawing a first part of polymer layer 72 against first peripheral region 67, and second window area 48b may be formed by drawing a second part of polymer layer 72 against second peripheral region 68.

In some configurations, peripheral cavity 63 may be cooperatively defined by both mold portions. That is, a portion of peripheral cavity 63 may be defined by peripheral regions of second mold portion 62, and another portion of peripheral cavity 63 may be defined by peripheral regions of first mold portion 61. In such cases, an inward extent of peripheral cavity 63 may be an aggregate extent of first peripheral regions in mold portions 61 and 62, or an aggregate extent of second peripheral regions in mold portions 61 and 62.

Note that polymer layers 71 and 72 may stretch in order to extend around tensile structures 50a-50b and into mold 60. In comparison with the thickness of barrier 40 in chamber 33, polymer layers 71 and 72 may exhibit greater original thickness. This difference between the original thicknesses of polymer layers 71 and 72 and the resulting thickness of barrier 40 may occur as a result of the stretching taking place at this stage of the thermoforming process.

A movable insert 65 that is supported by various springs 66 may depress to place a specific degree of pressure upon the components, thereby bonding and securing polymer layers 71 and 72 to opposite surfaces of tensile structures 50a-50b. Movable insert 65 includes peripheral cavity 63 that forms peripheral edge 43 from lower polymer layer 72. In some configurations of mold 60, movable insert 65 and springs 66 may be absent, and features such as peripheral regions 67 and 68 may instead be incorporated into lower mold portion 62.

As depicted in FIGS. 7-9E, polymer layers 71 and 72 are thermobonded to tensile structures 50a-50b, but in other manufacturing processes, polymer layers 71 and 72 may be otherwise secured to tensile structures 50a-50b. For example, polymer layers 71 and 72 may be secured to tensile layers 51a-51b and 52a-52b by use of thermoplastic threads or strips, as disclosed in U.S. Pat. No. 7,070,845 to Thomas, et al., or an adhesive.

Figure 9C:
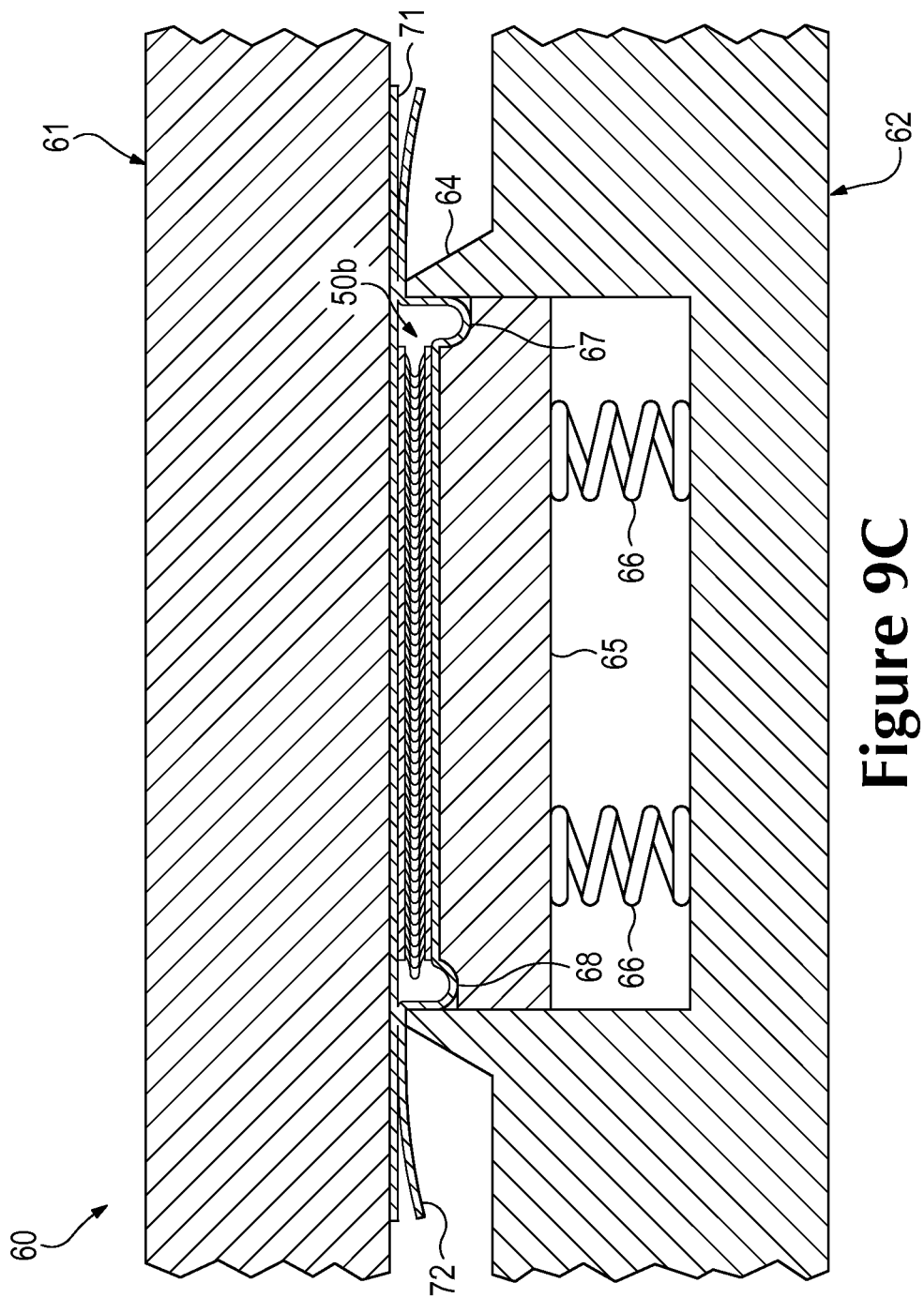

As mold 60 closes further, upper mold portion 61 and ridge 64 bond upper polymer layer 71 to lower polymer layer 72, as depicted in FIGS. 8C and 9C, thereby forming peripheral bond 44. Furthermore, portions of ridge 64 that extend away from tensile structures 50a-50b form a bond between other areas of polymer layers 71 and 72, contributing to the formation of inflation conduit 73.

In order to provide a second means for drawing polymer layers 71 and 72 into contact with the various contours of mold 60, the area between polymer layers 71 and 72 and proximal to tensile structures 50a-50b may be pressurized. During a preparatory stage of this method, an injection needle may be located between polymer layers 71 and 72, and the injection needle may be located such that ridge 64 envelops the injection needle when mold 60 closes. A gas may then be ejected from the injection needle such that polymer layers 71 and 72 engage ridge 64. Inflation conduit 73 may thereby be formed (see FIG. 8D) between polymer layers 71 and 72. The gas may then pass through inflation conduit 73, thereby entering and pressurizing the area proximal to tensile structures 50a-50b and between polymer layers 71 and 72. In combination with the vacuum, the internal pressure ensures that polymer layers 71 and 72 contact the various surfaces of mold 60.

As discussed above, a supplemental layer of a polymer material or thermoplastic threads may be applied to textile layers 51a-51b and 52a-52b in order to facilitate bonding between tensile structures 50a-50b and barrier 40. The pressure exerted upon the components by movable insert 65 ensures that the supplemental layer or thermoplastic threads form a bond with polymer layers 71 and 72.

Figure 9D:
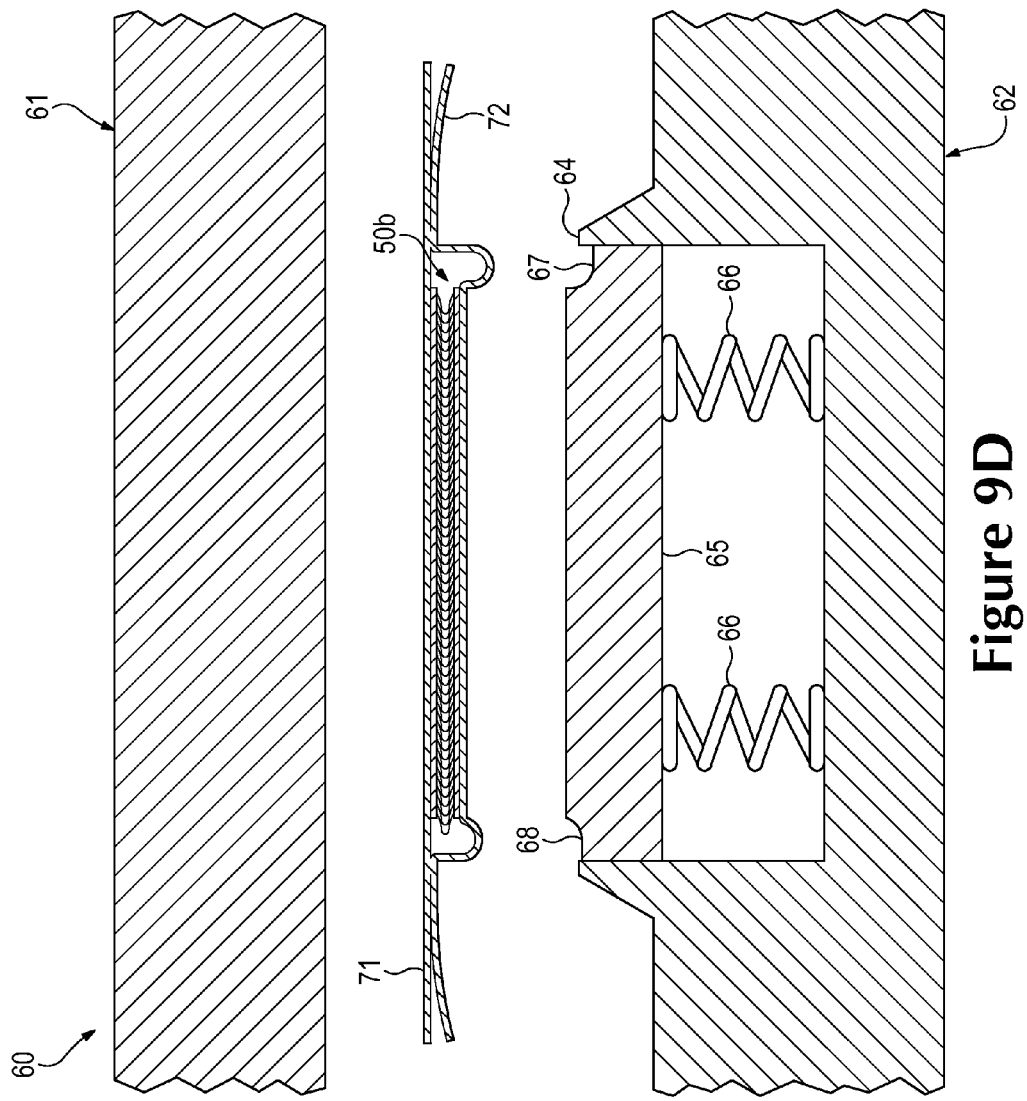

When bonding is complete, mold 60 is opened and chamber 33 and excess portions of polymer layers 71 and 72 are removed and permitted to cool, as depicted in FIGS. 8D and 9D. A fluid may be injected into chamber 33 through the inflation needle and inflation conduit 73. Upon exiting mold 60, tensile structures 50a-50b remain in the compressed configuration. When chamber 33 is pressurized, however, the fluid places an outward force upon barrier 40, which tends to separate barrier portions 41 and 42, thereby placing tensile structures 50a-50b in tension and imparting a contoured configuration to chamber 33. Chamber 33 may be pressurized to form window portion 45 at the peripheries of tensile structures 50a-50b and extending from at least part of each tensile structure 50a-50b to a periphery of outer barrier 40. An inward extent of first peripheral region 67 against which polymer layers 71 and 72 were drawn may exceed an inward extent of second peripheral region 68. In turn, in chamber 33 as pressurized, an extent of outward protrusion of first window area 47b may exceed an extent of outward protrusion of second window area 48b.

Figure 8E:
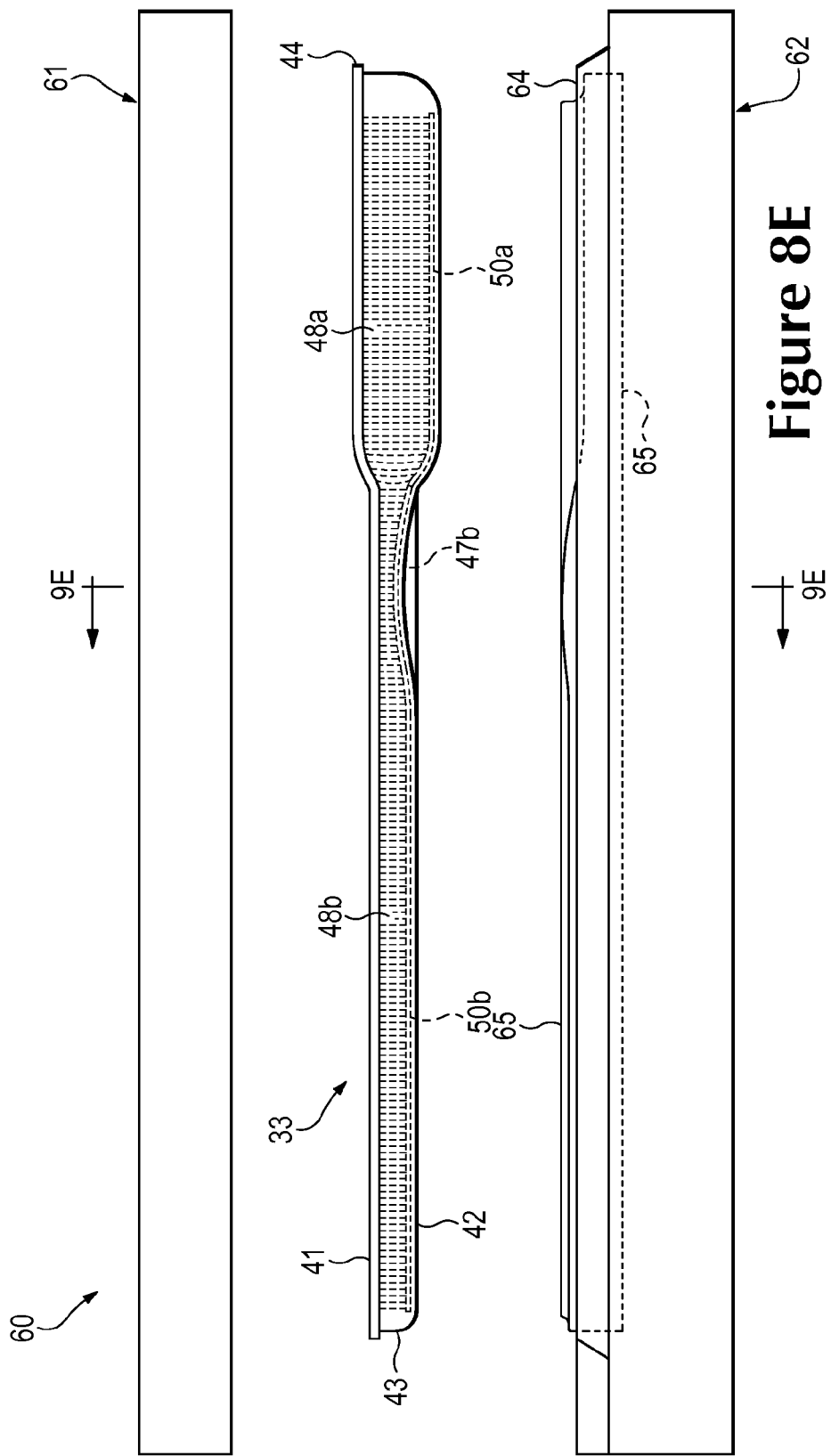
Figure 9E:
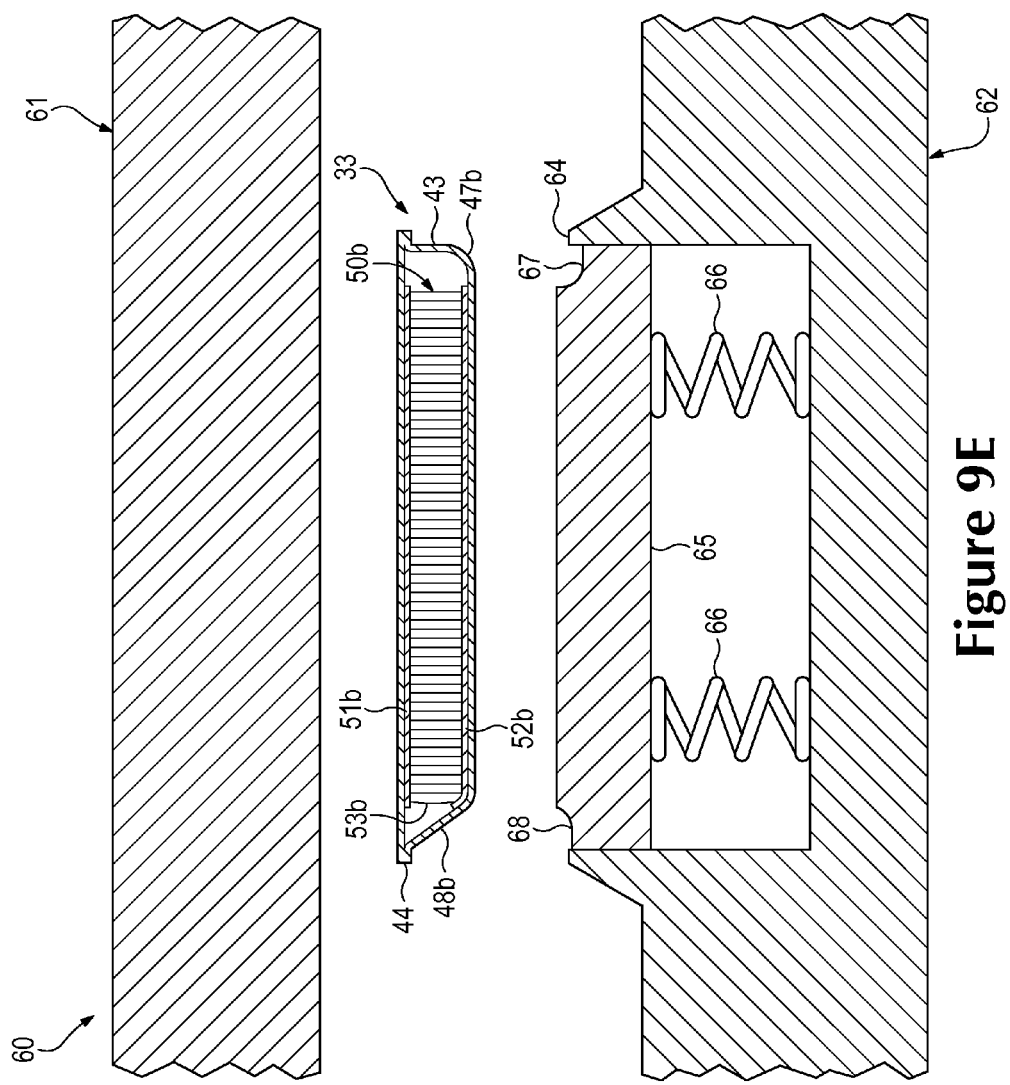

In addition, a sealing process is utilized to seal inflation conduit 73 adjacent to chamber 33 after pressurization. The excess portions of polymer layers 71 and 72 are then removed, thereby completing the manufacture of chamber 33, as depicted in FIGS. 8E and 9E. As an alternative, the order of inflation and removal of excess material may be reversed. As a final step in the process, chamber 33 may be tested and then incorporated into midsole 31 of footwear 10.

Further Chamber Configurations

Figure 10A:
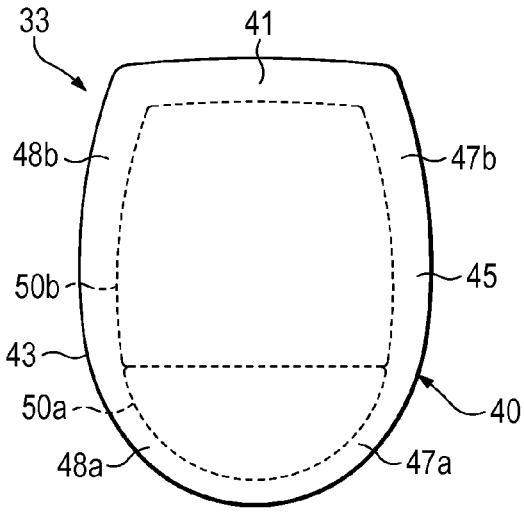
FIGS. 10A-10E are top plan views corresponding with FIG. 4 and depicting additional configurations of the chamber.

As depicted in FIGS. 1-6C, chamber 33 corresponds with substantially all of footwear 10. In other configurations, chamber 33 may correspond with other portions of footwear 10. For example, as depicted in FIG. 10A, chamber 33 corresponds with heel region 13 of footwear 10, and includes a first tensile structure 50a and a second tensile structure 50b, first tensile structure 50a having a height less than second tensile structure 50b. Correspondingly, first window area 47a and second window area 48a have lesser extents of outward protrusion than first window area 47b and second window area 48b.

Figure 10B:
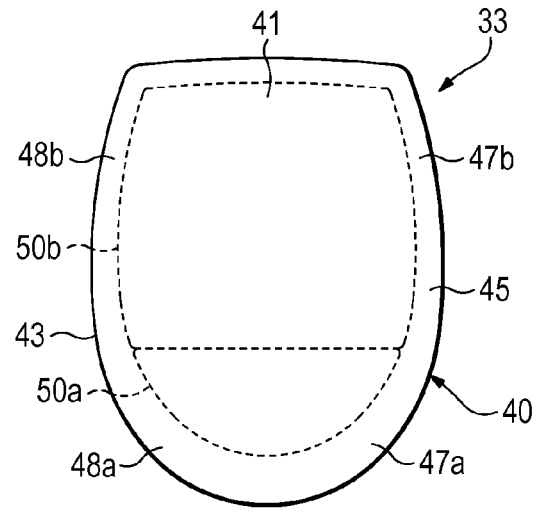

In an alternate example, as depicted in FIG. 10B, chamber 33 corresponds with heel region 13 of footwear 10, and includes a first tensile structure 50a and a second tensile structure 50b, first tensile structure 50a having a height greater than second tensile structure 50b. Correspondingly, first window area 47a and second window area 48a have greater extents of outward protrusion than first window area 47b and second window area 48b.

Figure 10C:
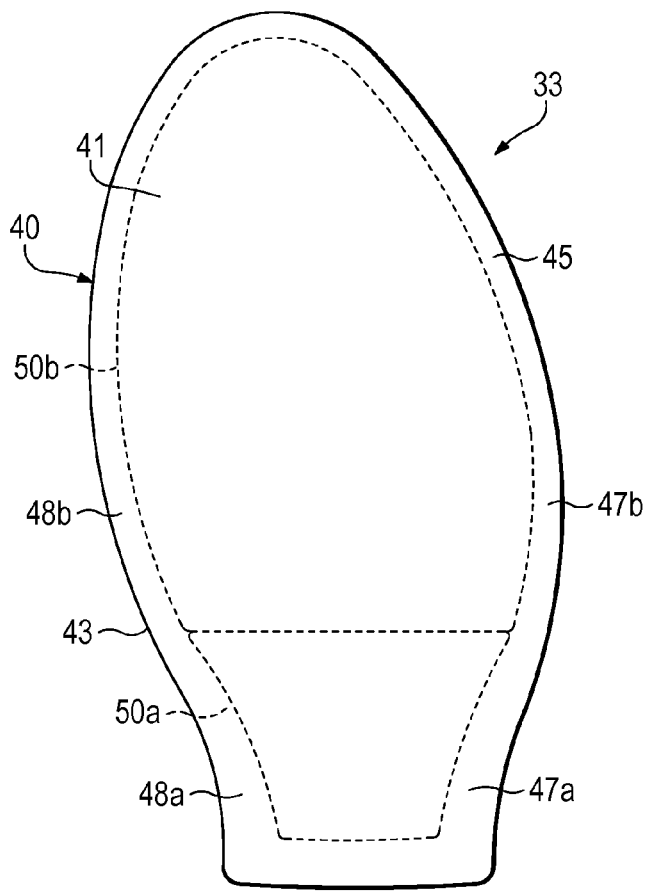

In another example, as depicted in FIG. 10C, chamber 33 corresponds with portions of midfoot region 12 and forefoot region 11 of footwear 10, and includes a first tensile structure 50a and a second tensile structure 50b, first tensile structure 50a having a height greater than second tensile structure 50b. Correspondingly, first window area 47a and second window area 48a have greater extents of outward protrusion than first window area 47b and second window area 48b.

Additionally, one or more regions of chamber 33 may be formed or shaped to accommodate additional portions of article of footwear 10. For example, in embodiments in which chamber 33 corresponds with substantially all of footwear 10, a cavity might be formed in midfoot region 12 of chamber 33 to accommodate an electrical or electronic device.

Figures 10D, 10E:
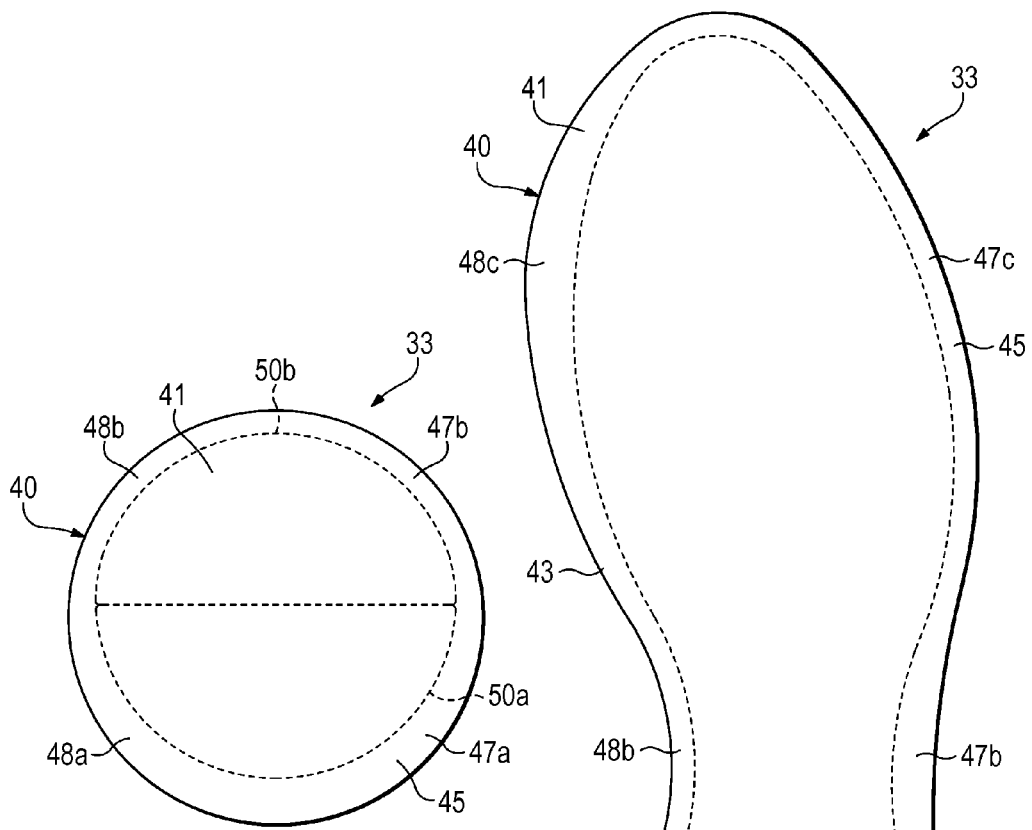

In a further example, as depicted in FIG. 10D, a substantially circular chamber for use in various apparel, athletic equipment, or other household goods or industrial products, includes a first tensile structure 50a and a second tensile structure 50b, first tensile structure 50a having a height greater than second tensile structure 50b. Correspondingly, first window area 47a and second window area 48a have greater extents of outward protrusion than first window area 47b and second window area 48b.

Additionally, In FIGS. 10A-10B, first window area 47a may have a greater extent of outward protrusion than second window area 48a, imparting an asymmetric shape to chamber 33, which in footwear may correspond with an asymmetric medio-lateral shape. Similarly, first window area 47b may have a greater extent of outward protrusion than second window area 48b, which may also impart an asymmetric shape to chamber 33. In some configurations, however, first window area 47a may have a lesser extent of outward protrusion than second window area 48a, or first window area 47b may have a lesser extent of outward protrusion than second window area 48b, which may impart an alternate asymmetric shape to chamber 33.

As depicted in FIGS. 1-6C, first window area 47b has a greater extent of outward protrusion than second window area 48b, and first window area 47b is located substantially opposite second window area 48b on chamber 33 in midfoot region 12 of footwear 10. In other configurations, window areas located substantially opposite each other on chamber 33 and having different extents of outward protrusion may be located in other regions of footwear 10. For example, as depicted in FIG. 10E, first window area 47a has a lesser extent of outward protrusion than second window area 48a, and first window area 47a is located substantially opposite second window area 48a in heel region 13 of chamber 33. Similarly, first window area 47c has a lesser extent of outward protrusion than second window area 48c, and first window area 47c is located substantially opposite second window area 48c in forefoot region 11 of chamber 33. In various configurations, window areas located substantially opposite each other on chamber 33 may have differing extents of outward protrusion, and the window area with the greater extent of outward protrusion may be either on lateral side 14 of chamber 33 or on medial side 15 of chamber 33.

Further Manufacturing Processes

Figure 11A:
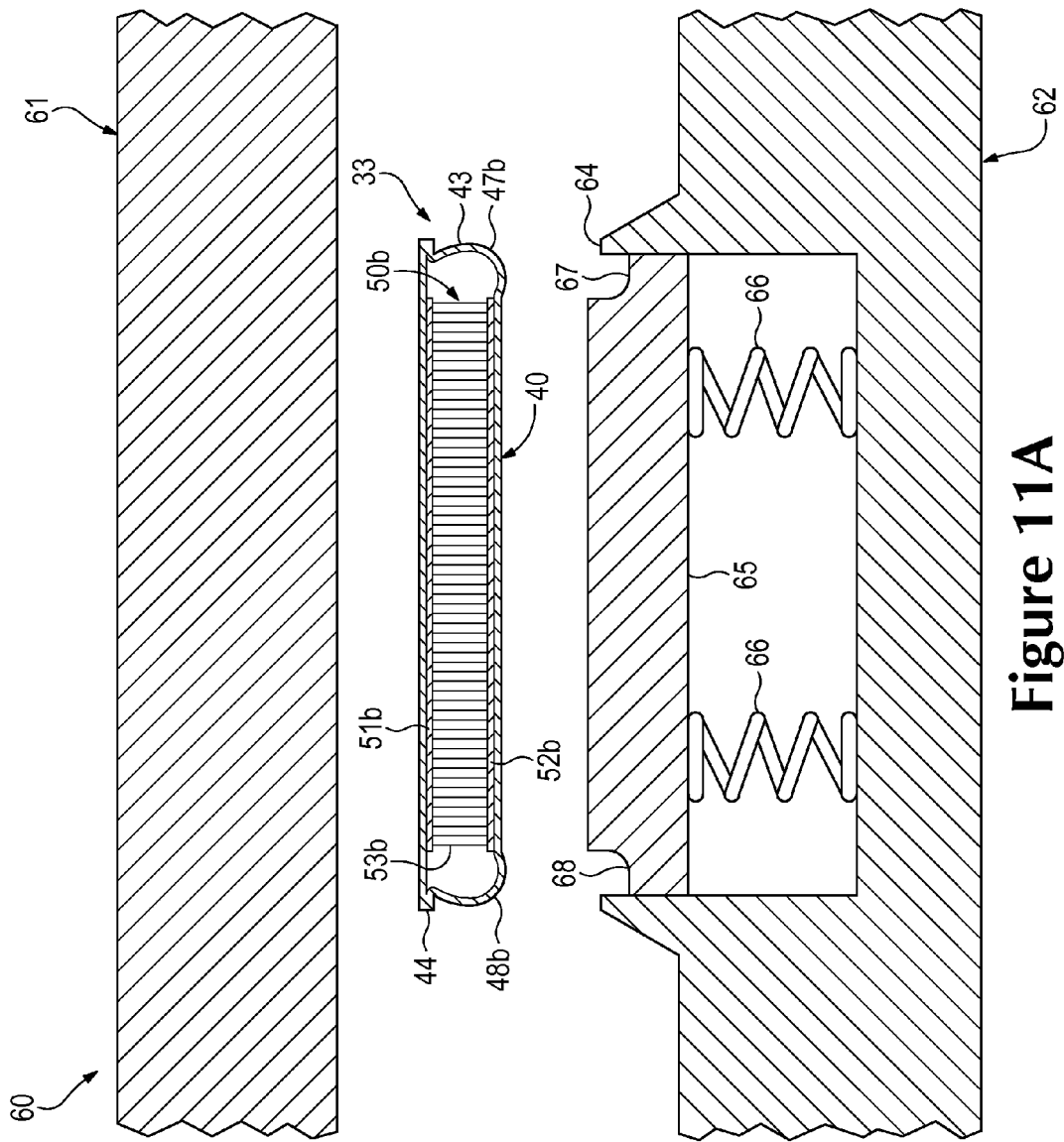
Figure 11B:
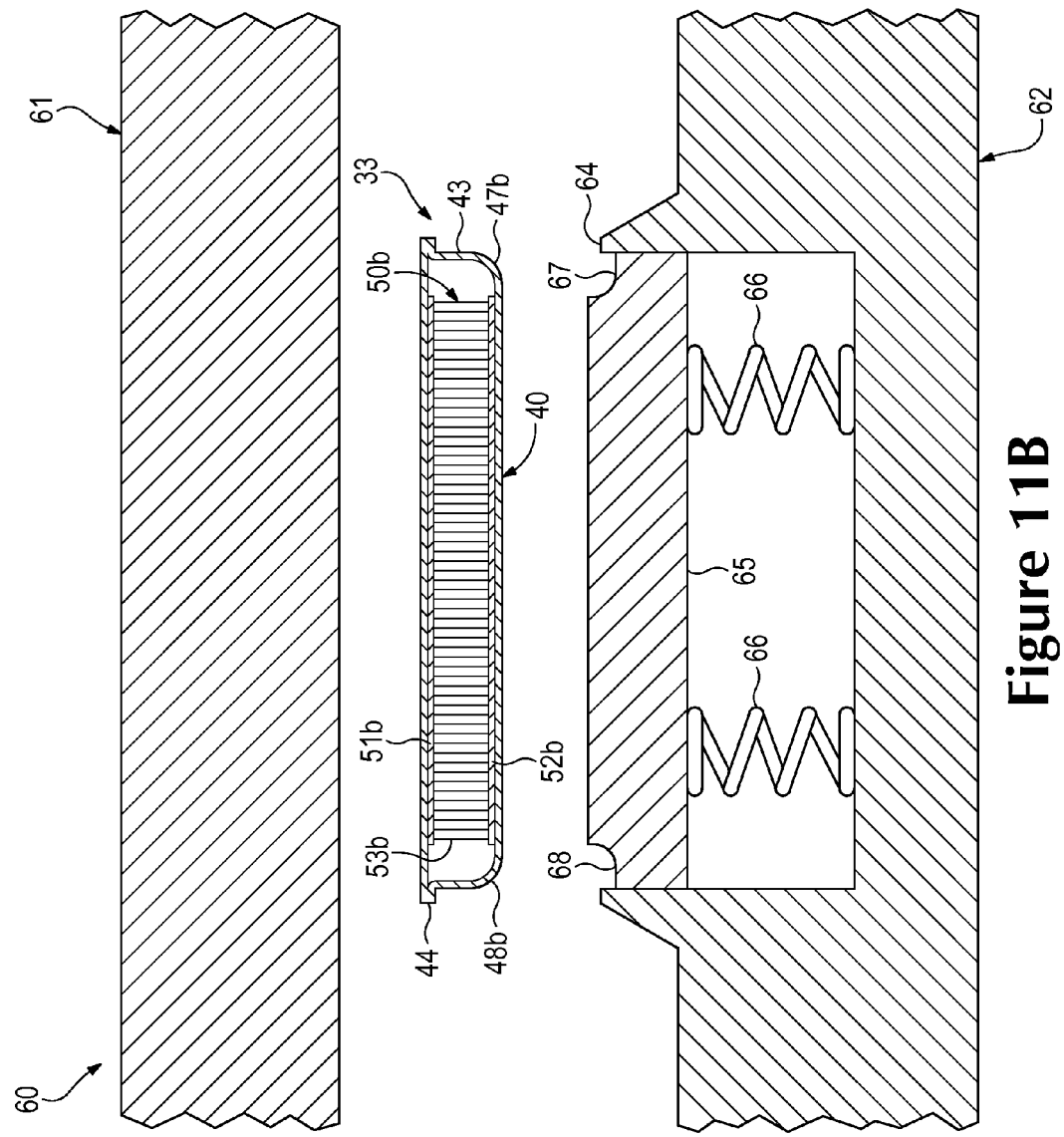
Figure 11C:
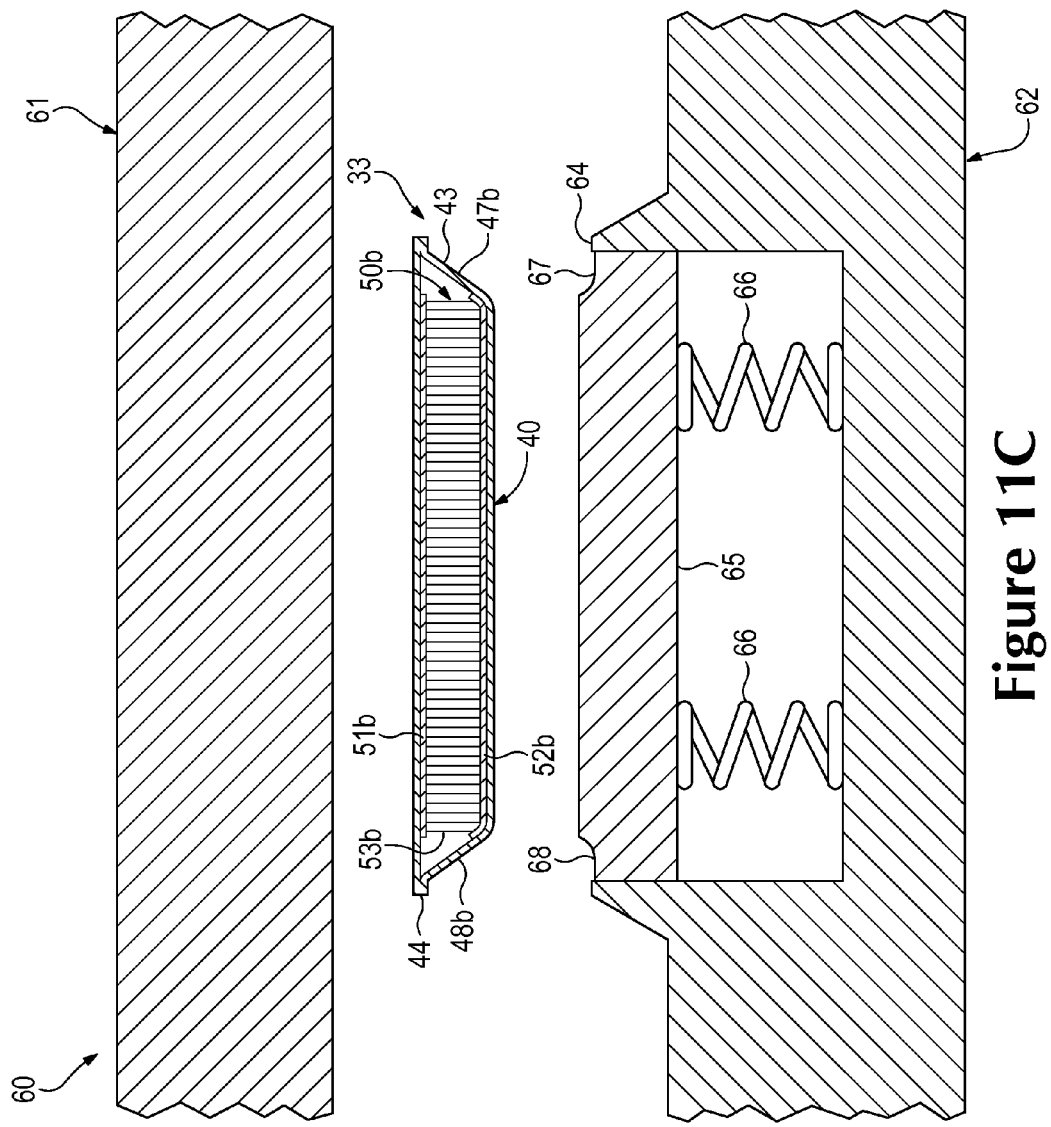

Various suitable manufacturing processes may incorporate peripheral cavities, or peripheral indentations, having various inward extents, which may correspond with various extents of outward protrusion of window areas on chamber 33. For example, peripheral regions 67 and 68 in FIG. 11A have a first inward extent, peripheral regions 67 and 68 in FIG. 11B have a second inward extent, and peripheral regions 67 and 68 in FIG. 11C have a third inward extent. In FIGS. 11A-11C, the first inward extent is greater than the second inward extent, and the second inward extent is greater than the third inward extent. Correspondingly, window areas 47b and 48b in FIG. 11A have a first extent of outward protrusion, window areas 47b and 48b in FIG. 11B have a second extent of outward protrusion, and window areas 47b and 48b in FIG. 11C have a third extent of outward protrusion. In FIGS. 11A-11C, the first extent of outward protrusion is greater than the second extent of outward protrusion, and the second extent of outward protrusion is greater than the third extent of outward protrusion.

Figure 11D:
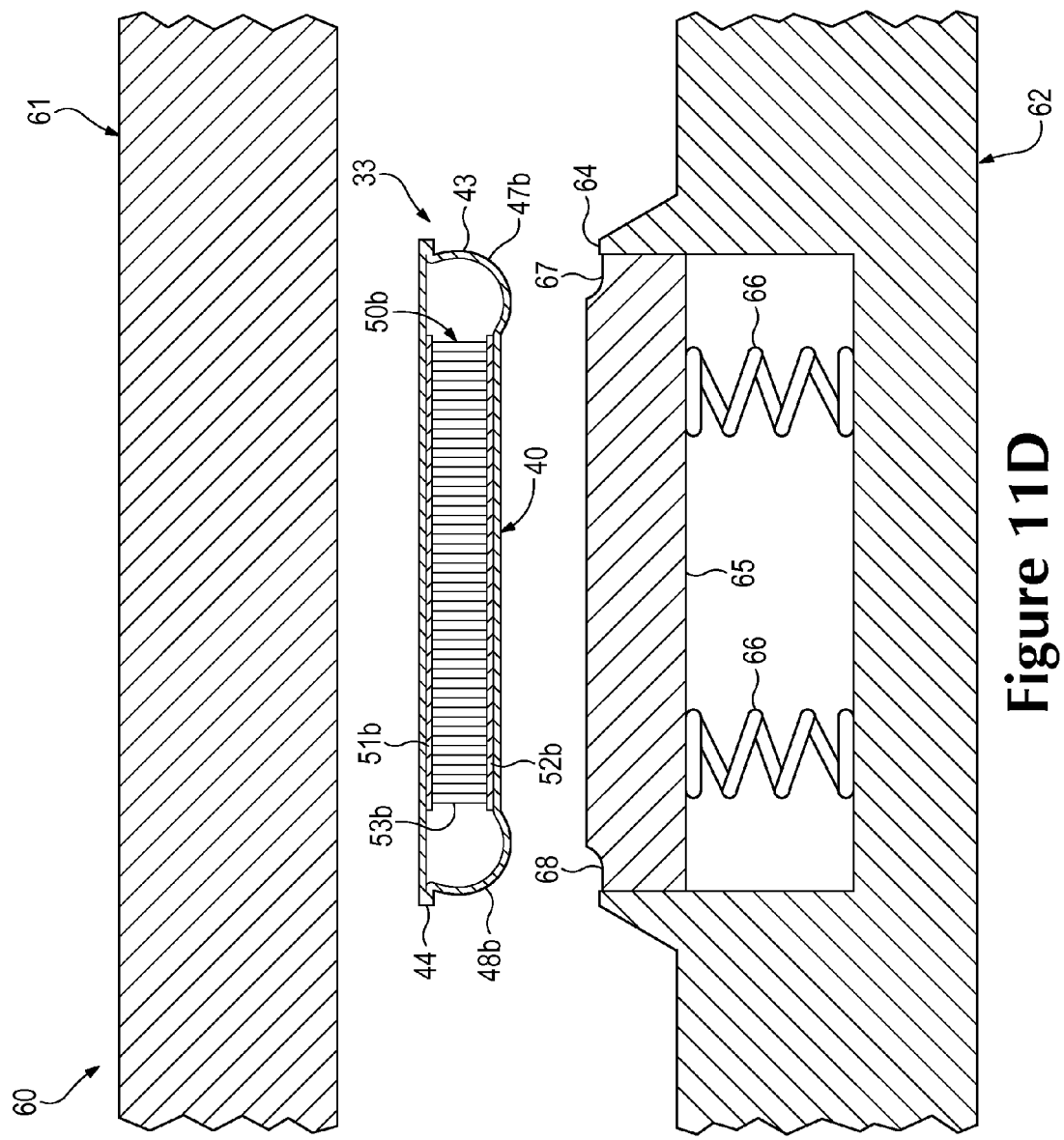

As depicted in FIGS. 1-9E, the extent of outward protrusion of window areas 47b and 48b corresponds with the inward extent of peripheral regions 67 and 68. In other configurations, the extent of outward protrusion of various window areas may correspond with more than the inward extent of associated peripheral regions. For example, as depicted in FIG. 11D, peripheral regions 67 and 68 have an inward extent similar to the third inward extent of peripheral regions 67 and 68 in FIG. 11C. However, tensile structure 50b in FIG. 11D has a lesser medio-lateral extent through chamber 33 than tensile structure 50b in 11C. In turn, window areas 47b and 48b in FIG. 11D have an extent of outward protrusion greater than window areas 47b and 48b in FIG. 11C.

Figure 11F:
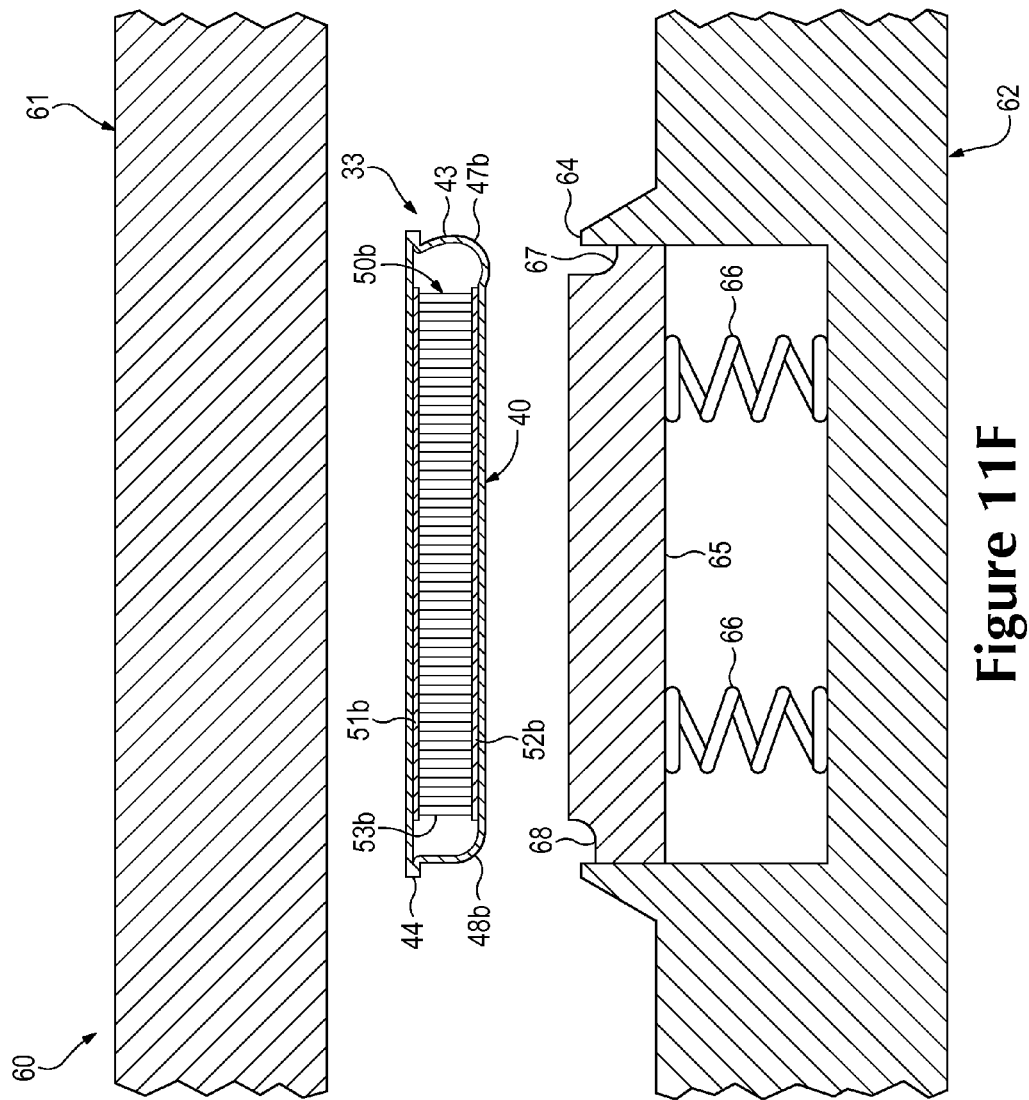

As depicted in FIGS. 1-9E, the outward extent of window areas 47b and 48b corresponds with a depth of the inward extent of peripheral regions 67 and 68. In other configurations, the outward extent of window areas may correspond with more than a depth of the inward extent of peripheral regions 67 and 68. For example, as depicted in FIG. 11E, the outward extent of first window area 47b corresponds with the inward extent of first peripheral region 67, which has a lesser depth but a greater width than second peripheral region 68. As an alternate example, as depicted in FIG. 11F, the outward extent of first window area 47b corresponds with the inward extent of first peripheral region 67, which has a greater depth but a lesser width than second peripheral region 68.

Figure 11G:
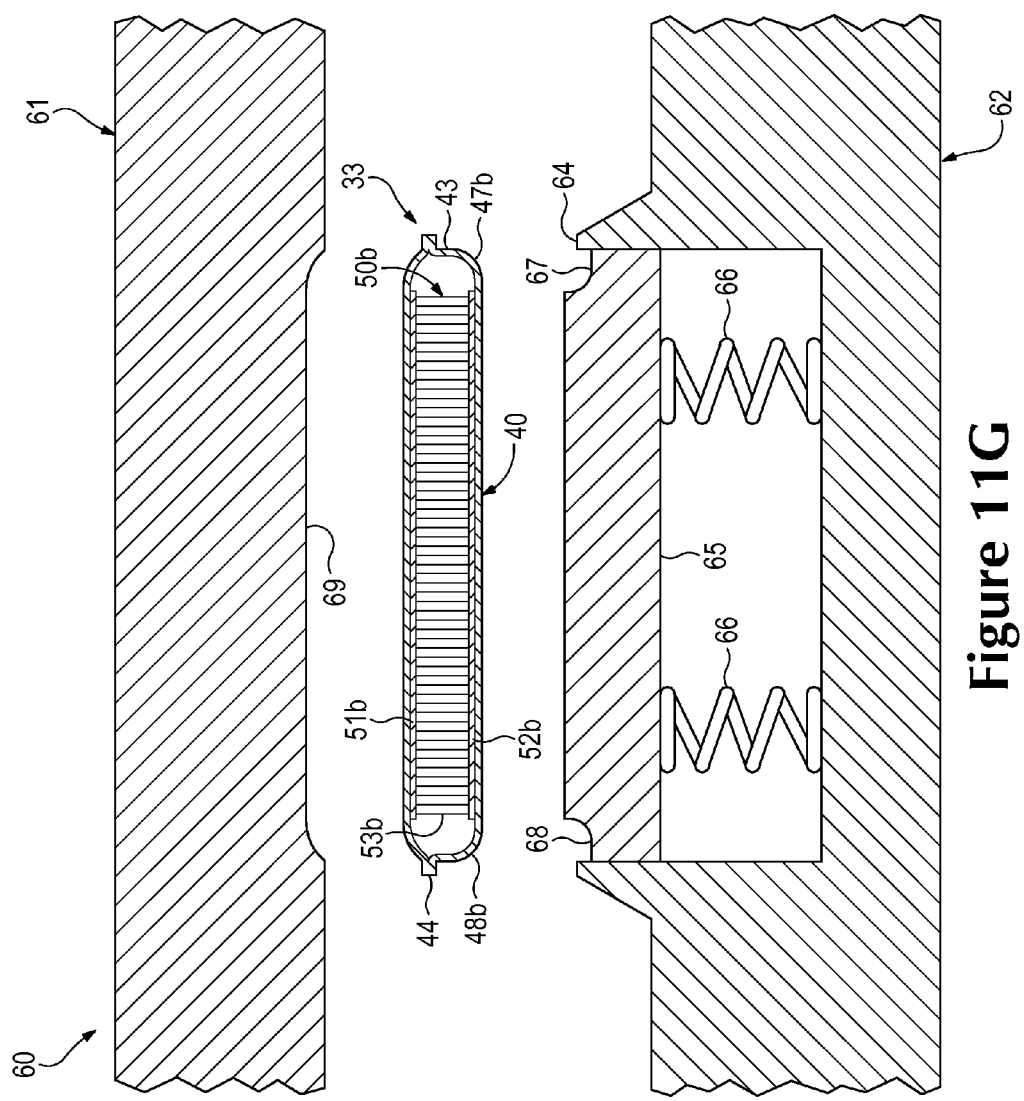

As depicted in FIG. 7-9E, a molding surface of first mold portion 61 is substantially flat. However, in other configurations, a molding surface of first mold portion 61 may not be flat. For example, as depicted in FIG. 11G, the molding surface of first mold portion 61 includes cavity 69, while peripheral regions 67 and 68 of second mold portion 62 have an inward extent similar to the second inward extent of FIG. 11B. Accordingly, the extent of outward protrusion of window areas 47b and 48b depends upon the extent of cavity 69 in addition to the inward extent of peripheral regions 67 and 68 in second mold portion 62.

Figure 11H:
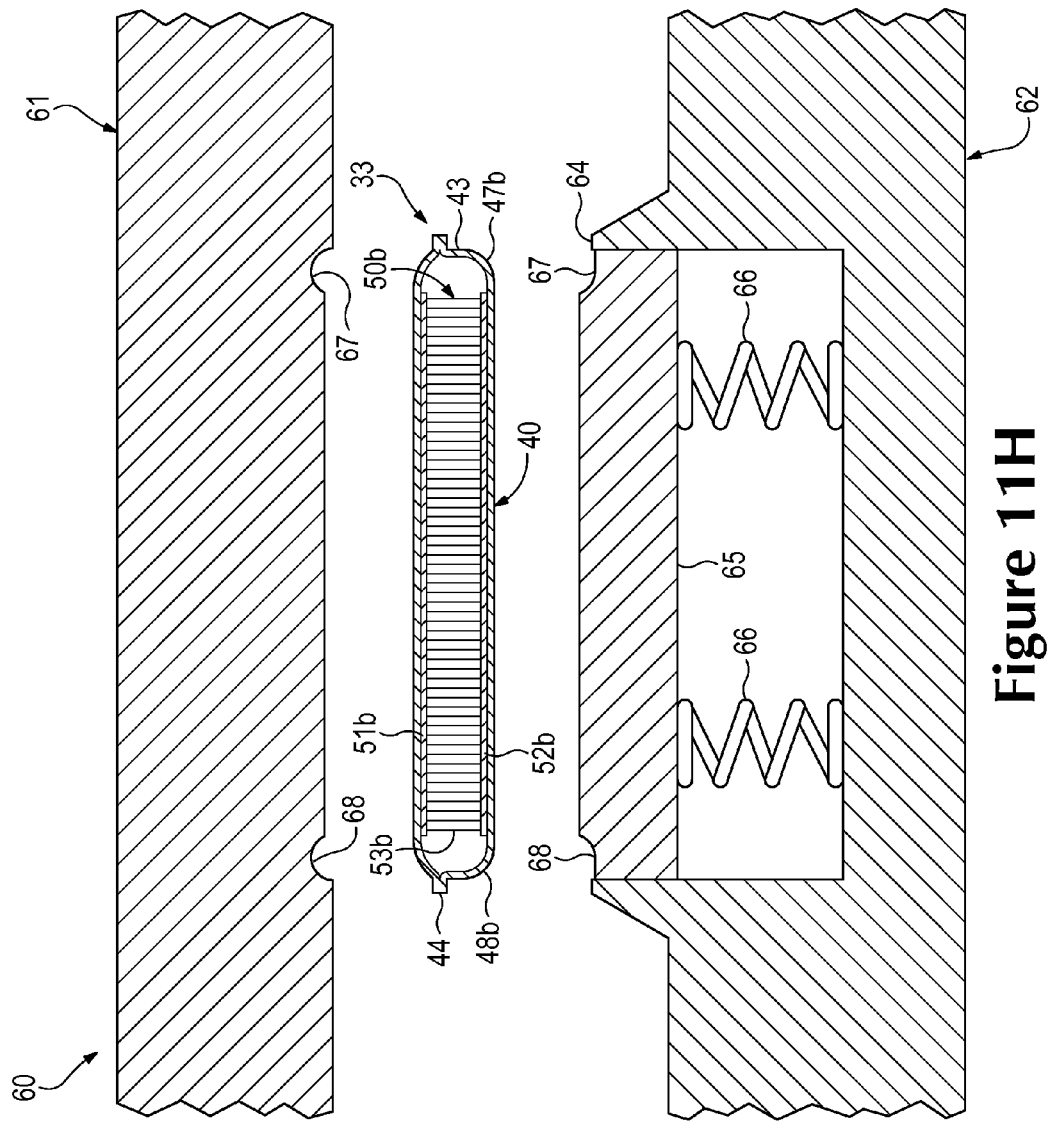

Alternatively, as depicted in FIG. 11H, peripheral regions 67 and 68 in first mold portion 62 have an inward extent similar to the third inward extent of FIG. 11C, and second mold portion 62 also has peripheral regions 67 and 68 within cavity 69 which have inward extents similar to the third extent of FIG. 11C. Accordingly, the extent of outward protrusion of first window area 47b depends upon the extent of first peripheral regions 67 in both first mold portion 61 and second mold portion 62, and the extent of outward protrusion of second window area 48b depends upon the extent of second peripheral regions 68 in both first mold portion 61 and second mold portion 62. That is, a portion of peripheral cavity 63 may be defined by peripheral regions 67 and 68 of second mold portion 62, and another portion of peripheral cavity 63 may be defined by peripheral regions 67 and 68 of first mold portion 61. Accordingly, an inward extent of peripheral cavity 63 may be an aggregate extent of first peripheral regions in mold portions 61 and 62, or an aggregate extent of second peripheral regions in mold portions 61 and 62.

Figure 11I:
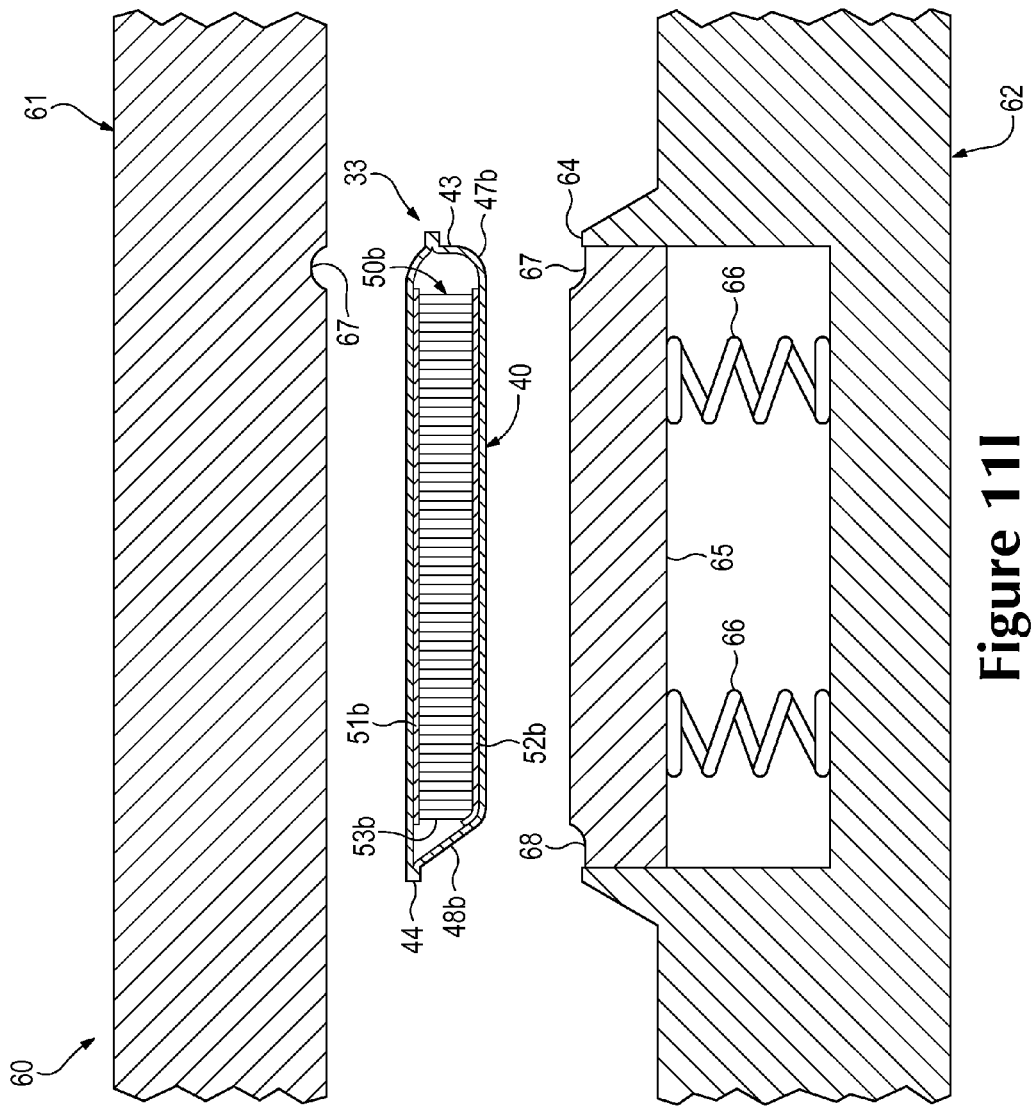

As a further alternative, as depicted in FIG. 11I, second peripheral region 68 has an inward extent similar to the inward extent of FIGS. 9A-9E, as do both first peripheral region 67 in second mold portion 62 and first peripheral region 67 in first mold portion 61. Accordingly, the extent of outward protrusion of second window area 48b of FIG. 11I is similar to the extent of outward protrusion of second window area 48b of FIGS. 9A-9E. In contrast, while the inward extent of first peripheral region 67 in second mold portion 61 of FIG. 11I is less than the inward extent of first peripheral region 67 in second mold portion 61 of FIGS. 9A-9E, the extent of outward protrusion of first window area 47b of FIG. 11I may be qualitatively similar to the extent of outward protrusion of first window area 47b of FIGS. 9A-9E. That is, the extent of outward protrusion of first window area 47b of FIG. 11I may have a lateral spacing or an overall extent in cross-sectional area or in volume that is similar to or substantially the same as the extent of outward protrusion of first window area 47b of FIGS. 9A-9E. Accordingly, as depicted in FIG. 11I, the extent of outward protrusion of first window area 47b may be greater than the extent of outward protrusion of second window area 48b, despite first peripheral region 67 of second mold portion 62 having similar or substantially the same inward extent as second peripheral region 68 of second mold portion 62.

Figure 11J:
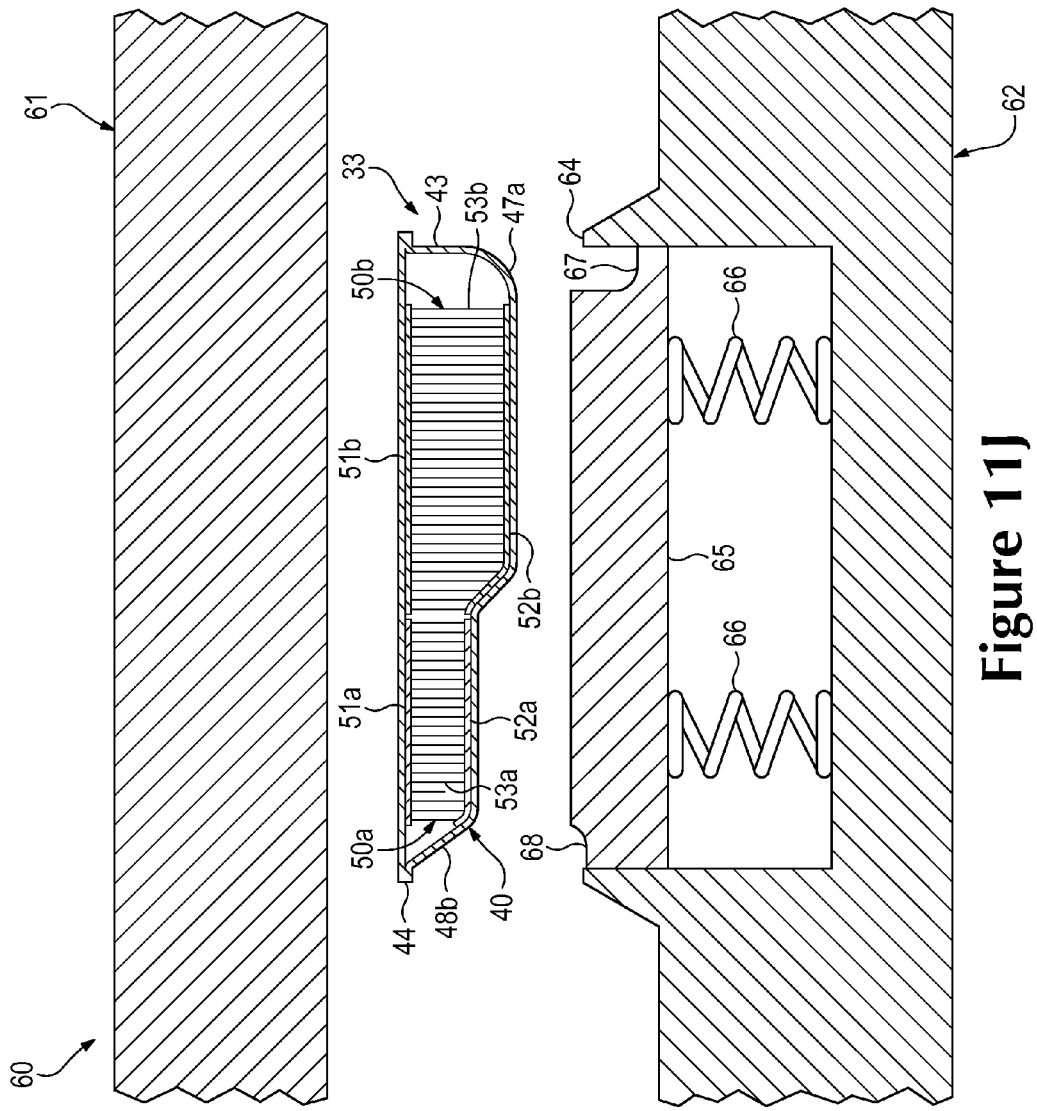
Figure 11K:
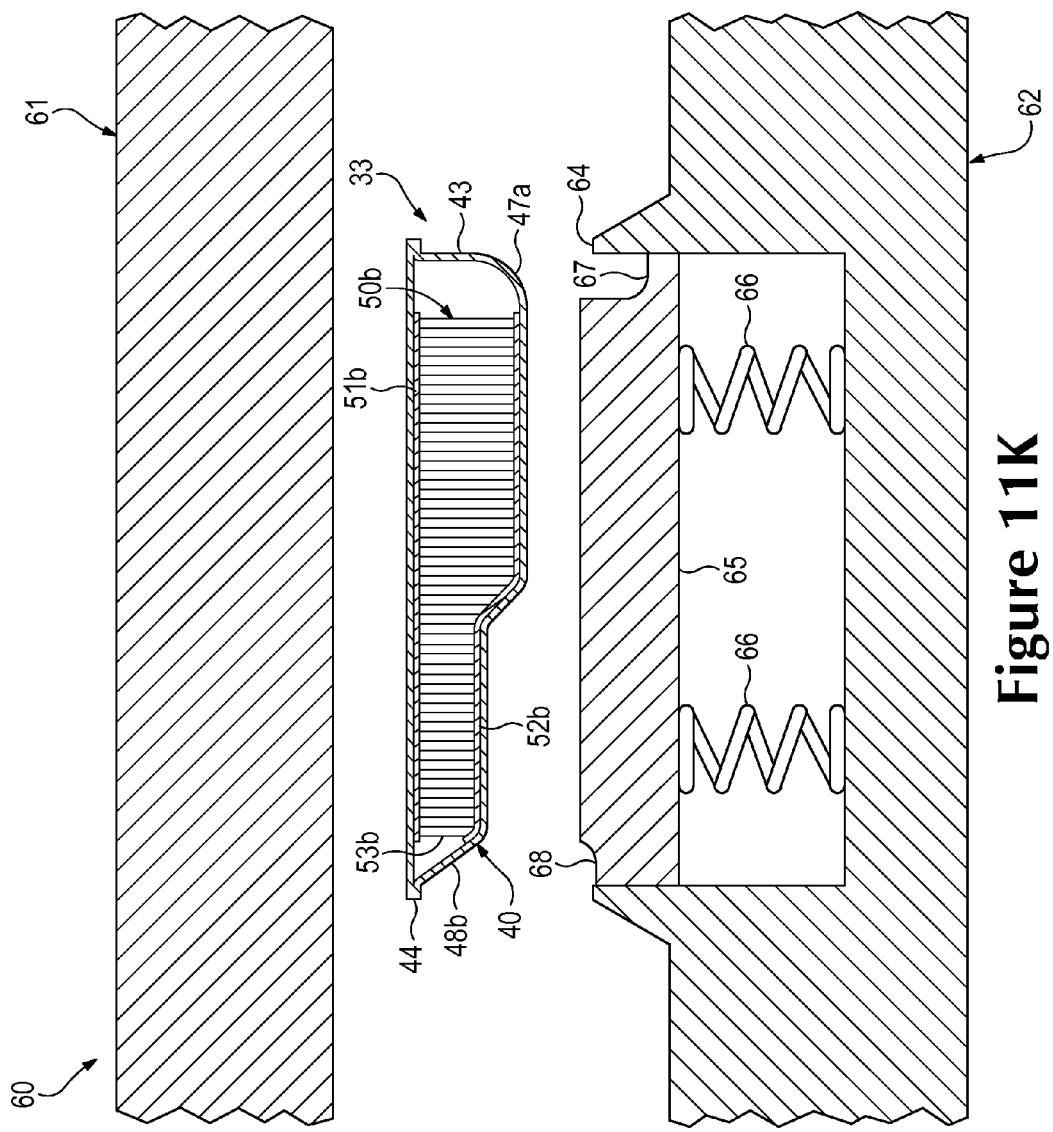
Figure 11L:
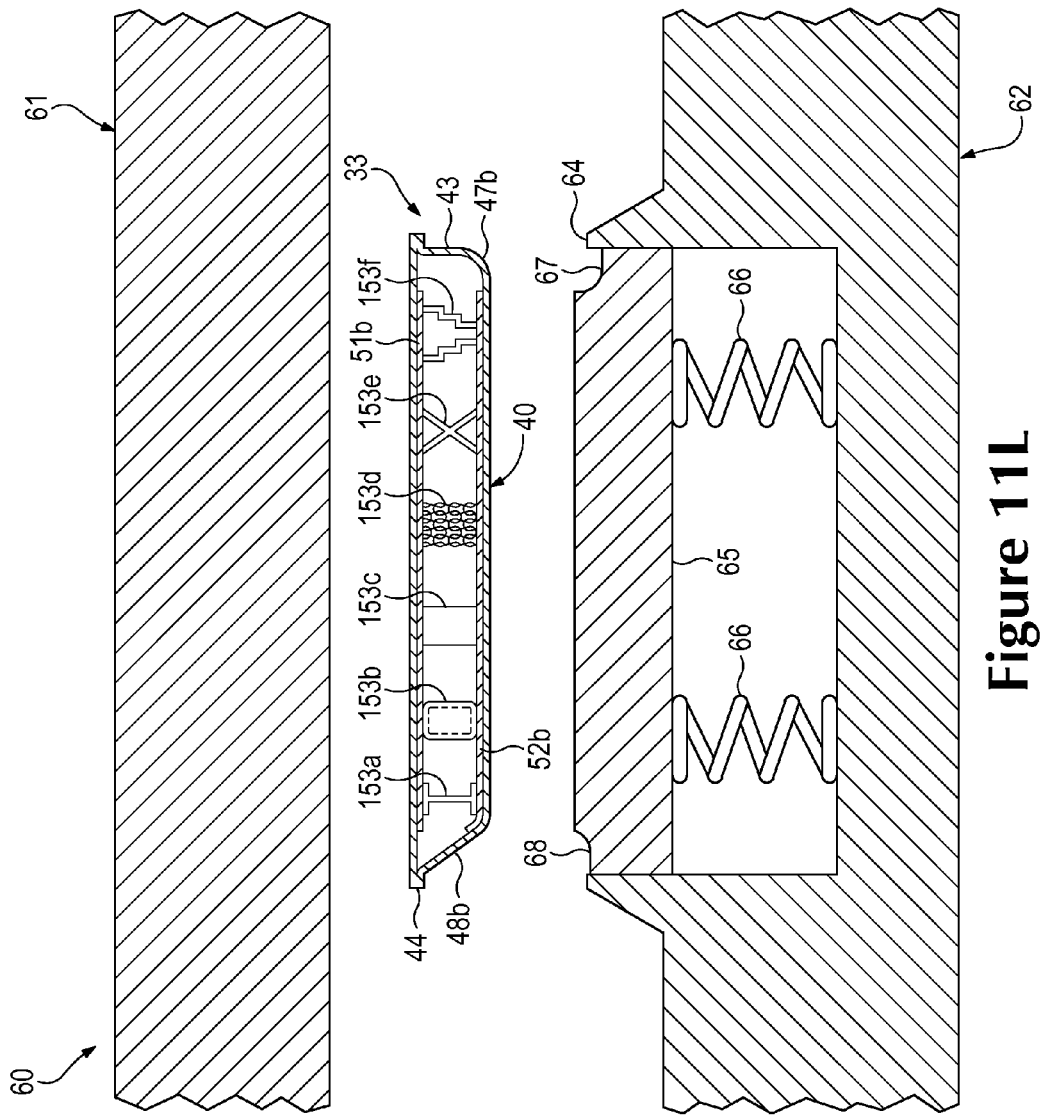

As depicted in FIGS. 1-9E, midfoot region 12 of chamber 33 includes a tensile structure 50b comprising a textile tensile member the height of which is substantially the same at all parts. In other configurations, various regions of footwear 10, such as midfoot region 12, may contain tensile structures having other configurations. For example, as depicted in FIG. 11J, a tensile structure in midfoot region 12 of chamber 33 includes two textile tensile members, each having a different height. In other configurations, tensile structures in any region or part of chamber 33 may include tensile members having substantially the same heights, and may include one, two, or more tensile members. In another example, as depicted in FIG. 11K, a tensile structure in midfoot region 12 of chamber 33 includes a textile tensile structure having a contour, such that a height of the textile tensile structure is greater on lateral side 14 of chamber 33 than on medial side 15 of chamber 33. In other configurations, tensile structures in any region or part of chamber 33 may include tensile members having any contour, such as an overall taper, a heel bevel, or a heel cup, for example. In a further example, as depicted in FIG. 11L, a tensile structure in midfoot region 12 of chamber 33 includes a variety of tether elements, such as I-shaped tether elements 153a, fluid-filled member 153b, foam member 153c, textile member 153d, x-shaped member 153e, or telescoping member 153f. In other configurations, tensile structures in any region or part of chamber 33 may include any of a variety of tether elements, such as any of the tether elements disclosed in U.S. patent application Ser. No. 12/630,642 to Peyton and U.S. patent application Ser. No. 12/777,167 to Peyton.

Figure 12:
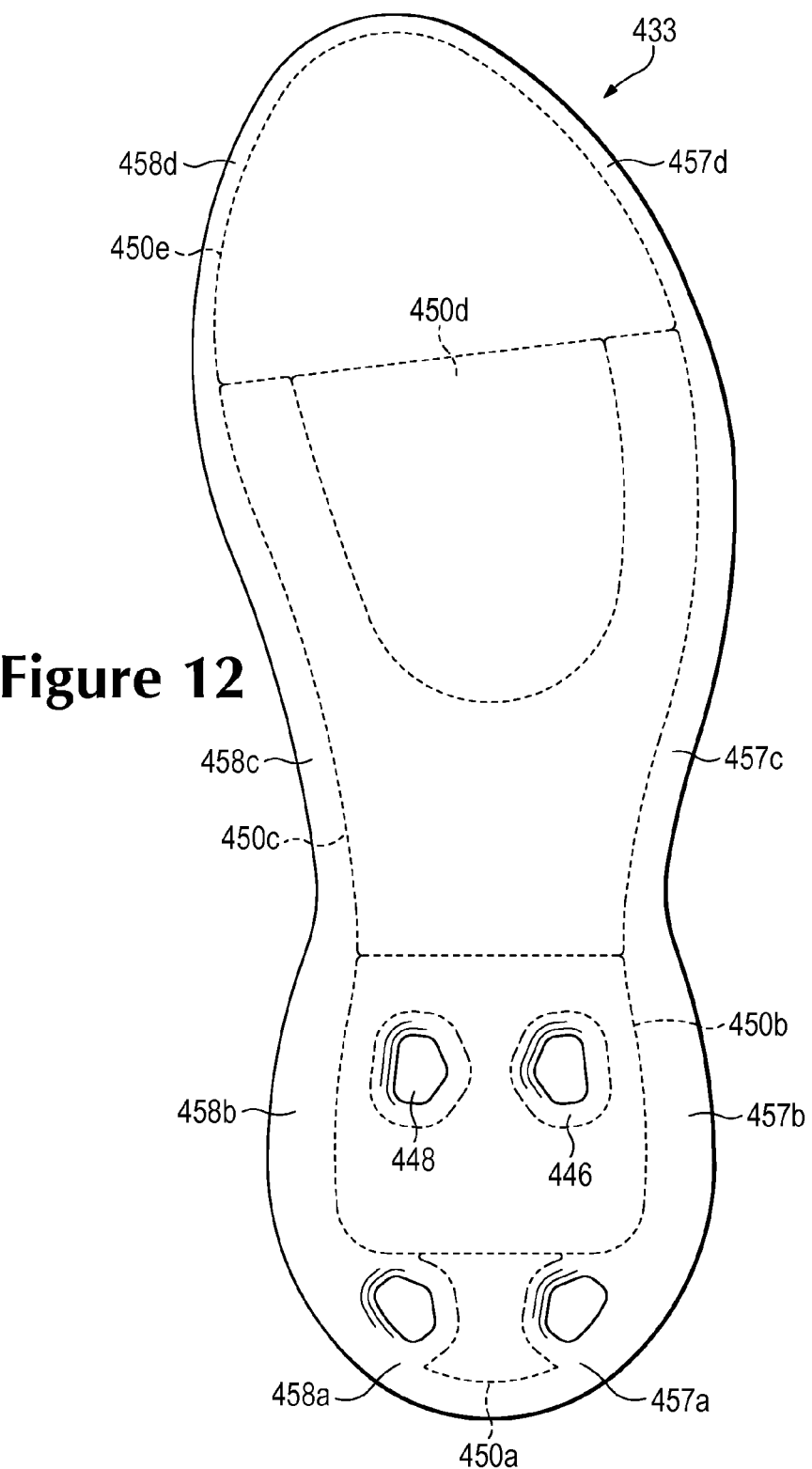
FIG. 12 is a top plan view of an alternate configuration of a fluid-filled chamber.
Figure 13:
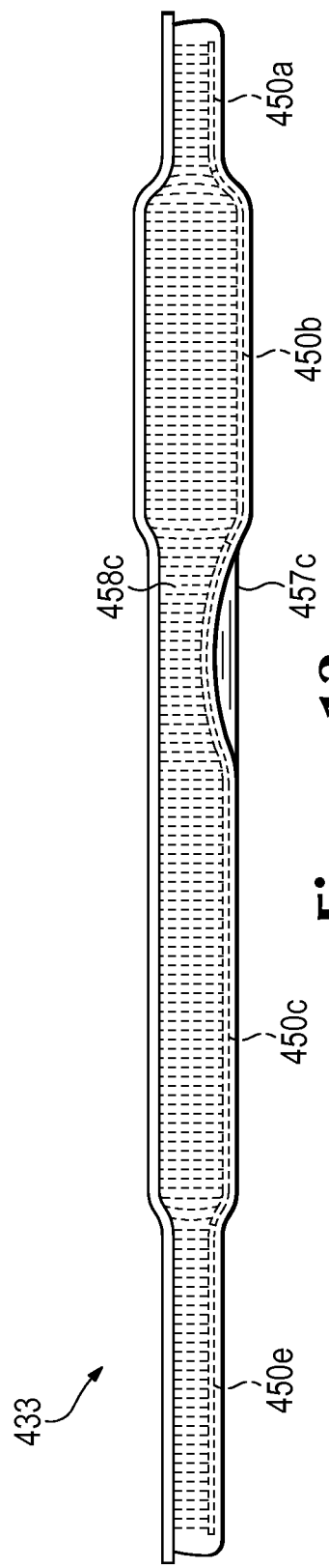
FIG. 13 is a medial side elevational view of the alternate configuration of the chamber.

Window areas of different extents of outward protrusion may be included in other fluid-filled chambers as well. For example, as depicted in FIGS. 12 and 13, first window areas 457a-457d and opposite second window areas 458a-458d have been included in fluid-filled chamber 433 along with other elements. Chamber 433 includes indented areas 446 and bonded regions 448. Chamber 433 also includes tensile members 450a-450e, whose heights may differ, which may in turn impart a contour to chamber 433. Additionally, chamber 433 includes a window portion having both first window areas 457a-457d and opposite second window areas 458a-458d, which may have different extents of outward protrusion, including a variation between a lateral side and a medial side of chamber 433.

The invention is disclosed above and in the accompanying Figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. An article of footwear incorporating a sole structure, the sole structure comprising:
a midsole that includes a fluid-filled chamber, the fluid-filled chamber comprising:
an outer barrier defining an interior void,
a tensile structure located within the interior void and bonded to the outer barrier, and
a window portion located around at least part of a periphery of the tensile structure; and
an outsole secured to the midsole, the outsole forming at least part of a ground-contacting surface of the footwear, wherein the window portion has a first area with a first height and a second area with a second height, the first height of the window portion being greater than the second height of the window portion, and wherein the tensile structure has a first height at a first part adjacent to the first area and a second height at a second part adjacent to the second area, the first height of the tensile structure being substantially the same as the second height of the tensile structure.

2. The article of footwear of claim 1, wherein the first part of the tensile structure includes a first tensile member, and the second part of the tensile structure includes a second tensile member.

3. The article of footwear of claim 1, wherein the first area of the window portion and the second area of the window portion are located substantially opposite each other on the chamber.

4. The article of footwear of claim 3, wherein one of the first area of the window portion and the second area of the window portion is located on a lateral side of the chamber.

5. The article of footwear of claim 3, wherein the first area of the window portion and the second area of the window portion are located in a midfoot region of the chamber.

6. The article of footwear of claim 1, wherein the chamber further comprises a peripheral edge spaced from the tensile structure by a first distance in the first area and by a second distance in the second area, the first distance being greater than the second distance.

7. The article of footwear of claim 1, wherein the tensile structure includes a textile tensile member.

8. An article of footwear incorporating a sole structure, the sole structure comprising:
a midsole that includes a fluid-filled chamber, the fluid-filled chamber comprising:
an outer barrier having an upper portion, an opposite lower portion, and a peripheral edge,
a tensile structure located within the outer barrier, the tensile structure having a first surface secured to the upper portion and a second surface secured to the lower portion, and
a window portion extending from at least part of the tensile structure to a periphery of the outer barrier, the window portion having a first perimeter at a first position and a second perimeter at a second position, the first perimeter being greater than the second perimeter; and
an outsole secured to the midsole, the outsole forming at least part of a ground-contacting surface of the footwear, wherein the first position is located on a lateral side of the chamber and the second position is located opposite the first position on a medial side of the chamber.

9. The article of footwear of claim 8, wherein the tensile structure has a first height at a first part adjacent to the first area and a second height at a second part adjacent to the second area, the first height being substantially the same as the second height.

10. The article of footwear of claim 8, wherein the tensile structure includes a first tensile member adjacent to the first perimeter and a second tensile member adjacent to the second perimeter.

11. The article of footwear of claim 8, wherein the first perimeter of the window portion and the second perimeter of the window portion are located in a midfoot region of the chamber.

12. The article of footwear of claim 8, wherein the peripheral edge is spaced from the tensile structure by a first distance at the first position and by a second distance at the second position, the first distance being greater than the second distance.

13. The article of footwear of claim 8, wherein the tensile structure includes a textile tensile member.

* * * * *